United States Patent
Ren et al.

(10) Patent No.: US 12,376,135 B2
(45) Date of Patent: Jul. 29, 2025

(54) USER EQUIPMENT TIMELINE QUANTIZATION

(71) Applicant: Qualcomm Incorporated, San Diego, CA (US)

(72) Inventors: Yuwei Ren, Beijing (CN); Huilin Xu, Temecula, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 17/774,502

(22) PCT Filed: Nov. 20, 2019

(86) PCT No.: PCT/CN2019/119604
§ 371 (c)(1),
(2) Date: May 5, 2022

(87) PCT Pub. No.: WO2021/097694
PCT Pub. Date: May 27, 2021

(65) Prior Publication Data
US 2022/0386298 A1 Dec. 1, 2022

(51) Int. Cl.
*H04W 72/51* (2023.01)
*H04L 27/26* (2006.01)
(Continued)

(52) U.S. Cl.
CPC ....... *H04W 72/51* (2023.01); *H04L 27/26025* (2021.01); *H04W 72/0446* (2013.01); *H04W 72/23* (2023.01); *H04W 80/02* (2013.01)

(58) Field of Classification Search
CPC . H04W 72/51; H04W 72/0446; H04W 72/23; H04W 80/02; H04L 27/26025;
(Continued)

(56) References Cited

U.S. PATENT DOCUMENTS 8,879,437 B2  11/2014 Malladi et al.
10,681,633 B2  6/2020 Ang et al.
(Continued)

FOREIGN PATENT DOCUMENTS

CN  102438322 A  5/2012
CN  103069903 A  4/2013
(Continued)

OTHER PUBLICATIONS

Qualcomm Incorporated: "Cross-Carrier Scheduling with Different Numerologies", 3GPP TSG-RAN WG1 #96bis, R1-1905279, Cross Carrier Scheduling with Different Numerologies, 3rd Generation Partnership Project (3GPP), Mobile Competence Centre, 650, Route Des Lucioles, F-06921 Sophia-Antipolis Cedex, France vol. RAN WG1, No. Xi'an, China, Apr. 8, 2019-Apr. 12, 2019, Apr. 7, 2019, XP051700348, 10 pages, Sections 1-5, Sections 2.2, 2.3, 2.4, p. 2-6.
(Continued)

*Primary Examiner* — Sharmin Chowdhury
(74) *Attorney, Agent, or Firm* — Holland & Hart LLP

(57) ABSTRACT

Methods, systems, and devices for wireless communications are described. In some cases, a user equipment (UE) may transmit, to a base station, a report indicating a capability of the UE to support symbol level quantization, slot level quantization, or both. The UE may identify that the UE is to utilize the slot level quantization. For instance, the UE may receive control signaling indicating that the UE is to utilize slot level quantization and may perform the identifying based on receiving the control signaling. The UE may receive a first transmission via a first channel and may communicate, responsive to receiving the first transmission, a second transmission via a second channel at a quantized start timing determined in accordance with the slot level quantization.

35 Claims, 25 Drawing Sheets

(51) Int. Cl.
*H04W 72/0446* (2023.01)
*H04W 72/23* (2023.01)
*H04W 80/02* (2009.01)

(58) Field of Classification Search
CPC ... H04L 1/1864; H04L 5/0055; H04L 5/0082; H04L 1/1854
See application file for complete search history.

(56) References Cited

U.S. PATENT DOCUMENTS

| | | | |
|---|---|---|---|
| 2010/0091893 A1 | 4/2010 | Gorokhov | |
| 2011/0268208 A1 | 11/2011 | Larsson et al. | |
| 2019/0110290 A1 | 4/2019 | Sun et al. | |
| 2019/0230706 A1 | 7/2019 | Li et al. | |
| 2019/0306923 A1 | 10/2019 | Xiong et al. | |
| 2020/0236692 A1* | 7/2020 | Lin | H04W 72/535 |
| 2021/0167828 A1* | 6/2021 | Shao | H04L 1/1819 |
| 2022/0104122 A1* | 3/2022 | Maleki | H04W 52/0216 |
| 2022/0140943 A1* | 5/2022 | Zhang | H04W 72/0446 |
| | | | 370/329 |

FOREIGN PATENT DOCUMENTS

| | | |
|---|---|---|
| CN | 107968758 A | 4/2018 |
| CN | 108781460 | 11/2018 |
| WO | WO-2012021772 | 2/2012 |
| WO | 2016049551 A1 | 3/2016 |
| WO | WO-2017176654 | 10/2017 |

OTHER PUBLICATIONS

Supplementary European Search Report—EP19953058—Search Authority—The Hague—Jul. 3, 2023.
International Search Report and Written Opinion—PCT/CN2019/119604—ISAEPO—Jul. 29, 2020.
Nokia, et al., "Remaining Details of Cross-Carrier Scheduling With Mixed Numerologies", 3GPP Draft, 3GPP TSG RAN WG1 Meeting #97, R1-1907068, May 17, 2019 (May 17, 2019), 5 Pages.
RAN1: "Response LS to IEEE 802.11 regarding LAA", 3GPP Draft, 3GPP TSG RAN WG1 #86bis, R1-166666, Gothenburg, Sweden, Aug. 22-26, 2016, Aug. 26, 2016 (Aug. 26, 2016), 10 Pages.

* cited by examiner

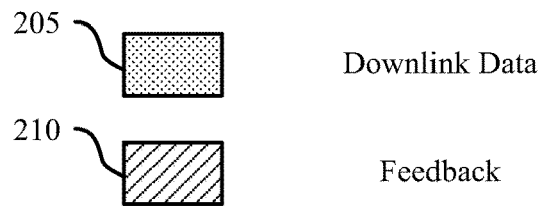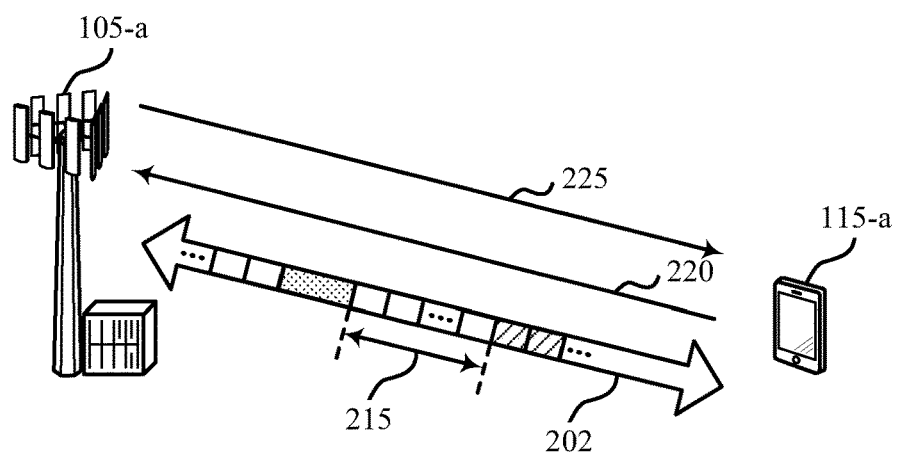
FIG. 2

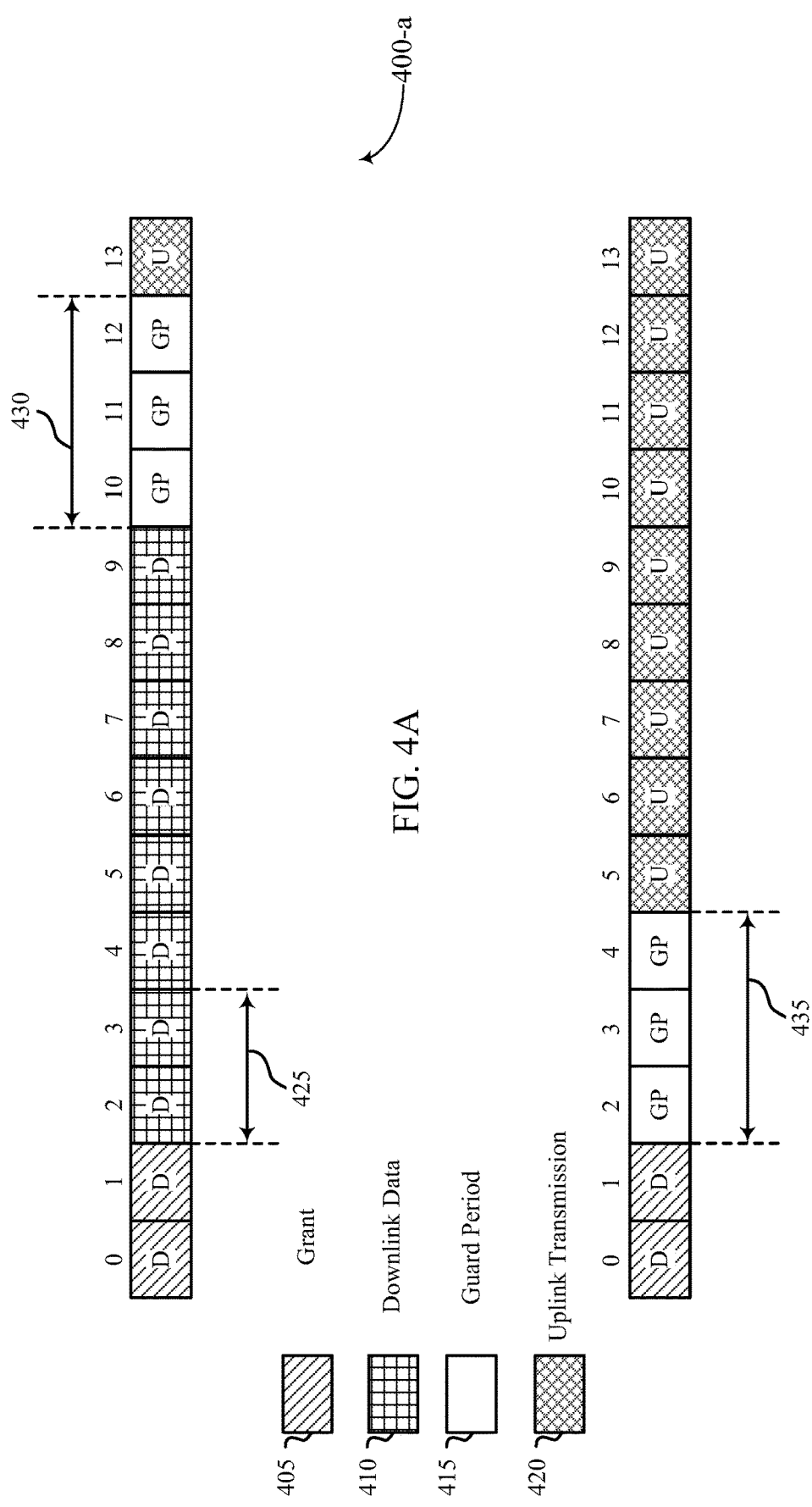

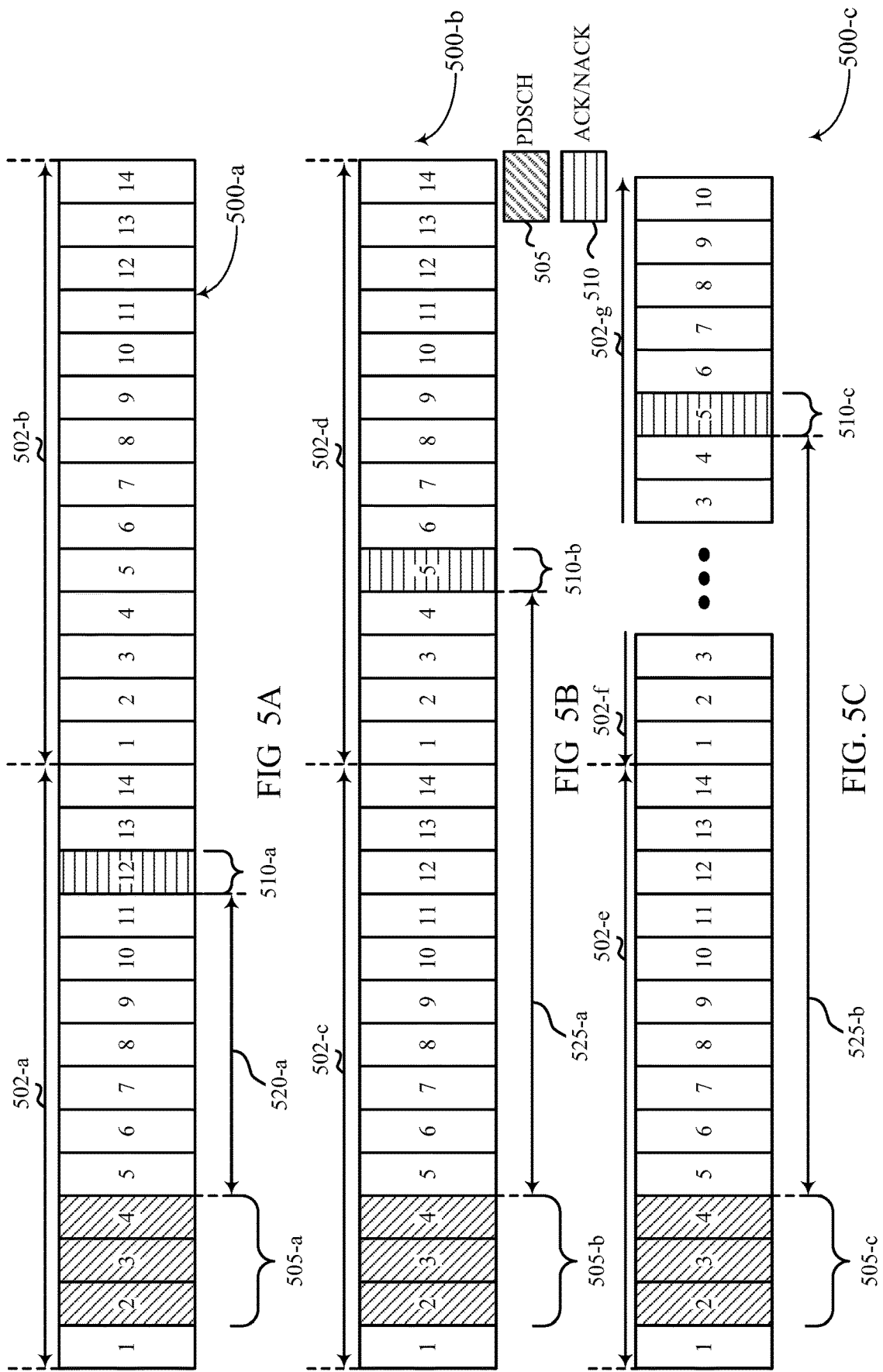

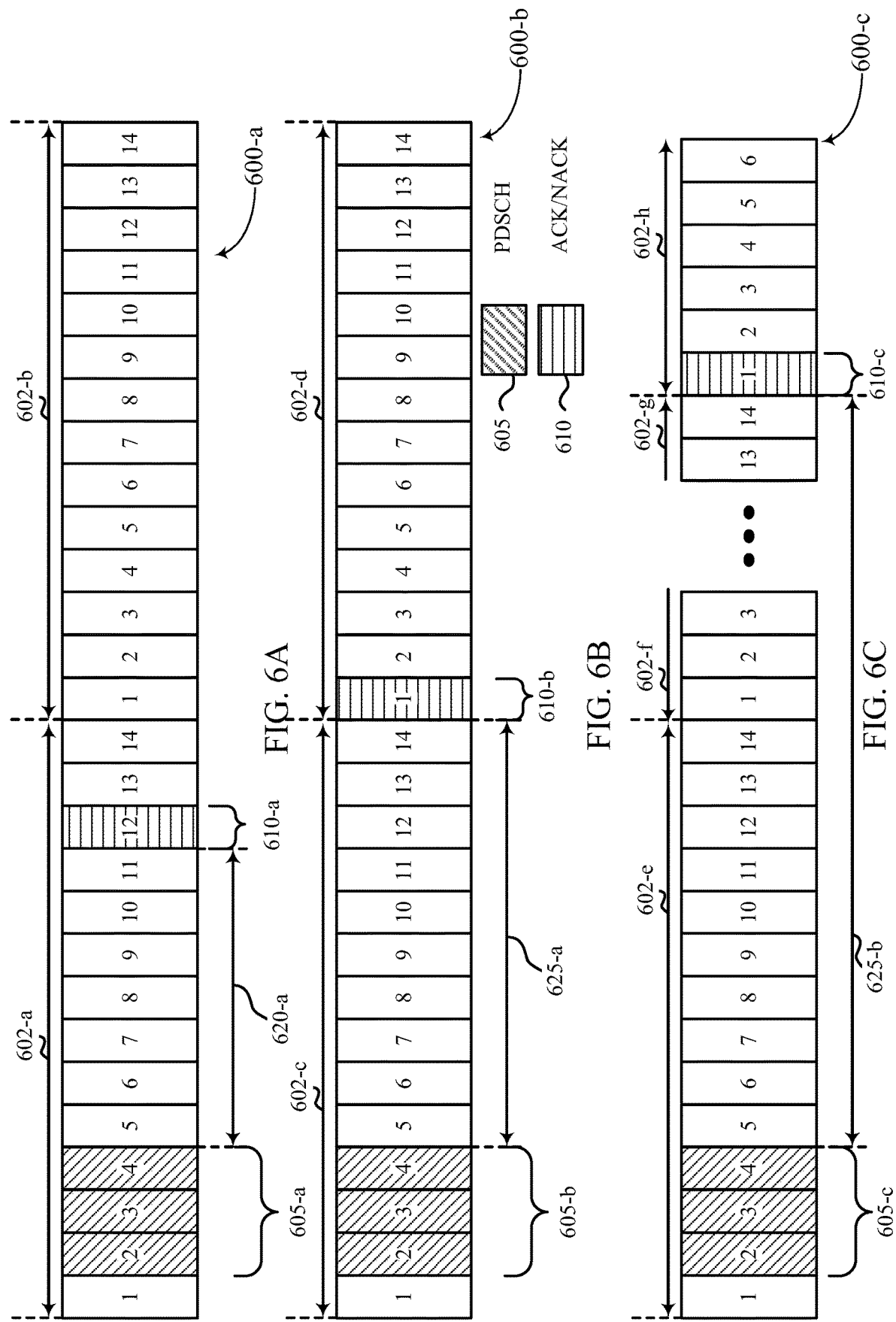

USER EQUIPMENT TIMELINE QUANTIZATION

CROSS REFERENCE

The present Application is a 371 national stage filing of International PCT Application No. PCT/CN2019/119604 by Ren et al., entitled "USER EQUIPMENT TIMELINE QUANTIZATION," filed Nov. 20, 2019, which is assigned to the assignee hereof, and which is expressly incorporated by reference in its entirety herein.

FIELD OF TECHNOLOGY

The following relates generally to wireless communications and more specifically to user equipment (UE) timeline quantization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE.

In some cases, a UE may receive a physical downlink control channel (PDCCH) transmission that indicates uplink or downlink resources for transmitting or receiving data, respectively. If the resources are uplink resources, the UE may transmit a physical uplink shared channel (PUSCH) transmission to the base station that includes the data. If the resources are downlink resources, the UE may receive a physical downlink shared channel (PDSCH) transmission from the base station that includes the data. After receiving the PDSCH transmission, the UE may transmit an acknowledgement (ACK) or negative acknowledgement (NACK) to the base station to indicate whether or not the UE received the PDSCH transmission. The UE may transmit the ACK or NACK a number of symbol periods after the PDSCH transmission is received. However, conventional techniques for determining when the UE is to transmit the ACK or NACK are computationally expensive for the UE.

SUMMARY

The described techniques relate to improved methods, systems, devices, and apparatuses that support UE timeline quantization. Generally, the described techniques provide for a UE to transmit, to a base station, a report indicating a capability of the UE to support symbol level quantization, slot level quantization, or both. The UE may identify that the UE is to utilize the slot level quantization. For instance, the UE may receive control signaling indicating that the UE is to utilize slot level quantization and may perform the identifying based on receiving the control signaling. The UE may receive a first transmission via a first channel and may communicate, responsive to receiving the first transmission, a second transmission via a second channel at a quantized start timing determined in accordance with the slot level quantization. Beneficially, it may be simpler for the UE to determine when to transmit the second transmission when using slot level quantization.

A method for wireless communications by a UE is described. The method may include transmitting a report indicating a capability of the UE to support symbol level quantization, slot level quantization, or both, identifying that the UE is to utilize the slot level quantization, receiving a first transmission via a first channel, and communicating, responsive to receiving the first transmission, a second transmission via a second channel at a quantized start timing determined in accordance with the slot level quantization.

An apparatus for wireless communications by a UE is described. The apparatus may include a processor, memory in electronic communication with the processor, and instructions stored in the memory. The instructions may be executable by the processor to cause the apparatus to transmit a report indicating a capability of the UE to support symbol level quantization, slot level quantization, or both, identify that the UE is to utilize the slot level quantization, receive a first transmission via a first channel, and communicate, responsive to receiving the first transmission, a second transmission via a second channel at a quantized start timing determined in accordance with the slot level quantization.

Another apparatus for wireless communications by a UE is described. The apparatus may include means for transmitting a report indicating a capability of the UE to support symbol level quantization, slot level quantization, or both, means for identifying that the UE is to utilize the slot level quantization, means for receiving a first transmission via a first channel, and means for communicating, responsive to receiving the first transmission, a second transmission via a second channel at a quantized start timing determined in accordance with the slot level quantization.

A non-transitory computer-readable medium storing code for wireless communications by a UE is described. The code may include instructions executable by a processor to transmit a report indicating a capability of the UE to support symbol level quantization, slot level quantization, or both, identify that the UE is to utilize the slot level quantization, receive a first transmission via a first channel, and communicate, responsive to receiving the first transmission, a second transmission via a second channel at a quantized start timing determined in accordance with the slot level quantization.

Some examples of the method, apparatuses, and non-transitory computer-readable medium described herein may further include operations, features, means, or instructions for receiving a grant allocating a resource of the first channel for the first transmission, where the second transmission may be a feedback message for the first transmission that may be communicated via the second channel at the quantized start timing determined in accordance with the slot level quantization.

In some examples of the method, apparatuses, and non-transitory computer-readable medium described herein, receiving the first transmission may include operations, features, means, or instructions for receiving the first transmission that may be a grant allocating a resource of the second channel for the second transmission.

Some examples of the method, apparatuses, and non-transitory computer-readable medium described herein may further include operations, features, means, or instructions for receiving control signaling indicating that the UE may be to utilize the slot level quantization by converting a symbol level offset to a number of slots using a ceiling function and applying a slot level offset relative to an ending symbol period of the first transmission based on the number of slots to identify the quantized start timing for the second transmission, where the second transmission may be communicated in accordance with the quantized start timing.

Some examples of the method, apparatuses, and non-transitory computer-readable medium described herein may further include operations, features, means, or instructions for receiving control signaling indicating that the UE may be to utilize the slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission, where the second transmission may be communicated in accordance with the quantized start timing.

In some examples of the method, apparatuses, and non-transitory computer-readable medium described herein, identifying that the UE may be to utilize the slot level quantization may include operations, features, means, or instructions for identifying that the UE may be to utilize the slot level quantization based on a determination that control signaling indicating which of the symbol level quantization or the slot level quantization to use may have not been received in response to transmission of the report.

In some examples of the method, apparatuses, and non-transitory computer-readable medium described herein, transmitting the report may include operations, features, means, or instructions for transmitting the report providing a first capability indication of the UE to support the symbol level quantization, the slot level quantization, or both, for a first bandwidth part.

In some examples of the method, apparatuses, and non-transitory computer-readable medium described herein, transmitting the report may include operations, features, means, or instructions for transmitting the report providing a second capability indication of the UE to support the symbol level quantization, the slot level quantization, or both, for a second bandwidth part that may be different than the first bandwidth part.

In some examples of the method, apparatuses, and non-transitory computer-readable medium described herein, transmitting the report may include operations, features, means, or instructions for transmitting the report providing a capability indication of the UE to support the symbol level quantization, the slot level quantization, or both, for each bandwidth part of a set of bandwidth parts.

In some examples of the method, apparatuses, and non-transitory computer-readable medium described herein, transmitting the report may include operations, features, means, or instructions for transmitting the report providing a first capability indication of the UE to support the slot level quantization, the symbol level quantization, or both, on a first bandwidth part and a second capability indication of the UE to support the symbol level quantization, the slot level quantization, or both, on a second bandwidth part.

Some examples of the method, apparatuses, and non-transitory computer-readable medium described herein may further include operations, features, means, or instructions for receiving control signaling indicating that the UE may be to utilize the slot level quantization on a first bandwidth part and the slot level quantization or the symbol level quantization on a second bandwidth part.

In some examples of the method, apparatuses, and non-transitory computer-readable medium described herein, identifying that the UE may be to utilize the slot level quantization may include operations, features, means, or instructions for receiving control signaling that may be radio resource control signaling, downlink control information, a medium access control (MAC) control element, or any combination thereof, indicating that the UE may be to utilize the slot level quantization.

Some examples of the method, apparatuses, and non-transitory computer-readable medium described herein may further include operations, features, means, or instructions for receiving control signaling indicating that the UE may be to utilize the symbol level quantization, receiving a third transmission on the first channel, and communicating, responsive to receiving the third transmission, a fourth transmission via the second channel at a second quantized starting time determined in accordance with the symbol level quantization.

Some examples of the method, apparatuses, and non-transitory computer-readable medium described herein may further include operations, features, means, or instructions for receiving control signaling indicating that the UE may be to apply the symbol level quantization on a first carrier and the slot level quantization on a second carrier that differs from the first carrier, where the first carrier may be a scheduling carrier for the second carrier.

Some examples of the method, apparatuses, and non-transitory computer-readable medium described herein may further include operations, features, means, or instructions for receiving control signaling indicating that the UE may be to apply the symbol level quantization on a first carrier having a first subcarrier spacing and the slot level quantization on a second carrier having a second subcarrier spacing that may be higher than the first subcarrier spacing.

Some examples of the method, apparatuses, and non-transitory computer-readable medium described herein may further include operations, features, means, or instructions for receiving control signaling that may be radio resource control signaling, downlink control information, a medium access control (MAC) control element, or any combination thereof, indicating which of the slot level quantization or the symbol level quantization the UE may be to utilize.

A method for wireless communications by a base station is described. The method may include receiving a report indicating a capability of a UE to support symbol level quantization, slot level quantization, or both, determining that the UE is to utilize the slot level quantization, transmitting a first transmission via a first channel, and communicating, responsive to transmitting the first transmission, a second transmission via a second channel at a quantized start timing determined in accordance with the slot level quantization.

An apparatus for wireless communications by a base station is described. The apparatus may include a processor, memory in electronic communication with the processor, and instructions stored in the memory. The instructions may be executable by the processor to cause the apparatus to receive a report indicating a capability of a UE to support symbol level quantization, slot level quantization, or both, determine that the UE is to utilize the slot level quantization, transmit a first transmission via a first channel, and communicate, responsive to transmitting the first transmission, a second transmission via a second channel at a quantized start timing determined in accordance with the slot level quantization.

Another apparatus for wireless communications by a base station is described. The apparatus may include means for receiving a report indicating a capability of a UE to support symbol level quantization, slot level quantization, or both, means for determining that the UE is to utilize the slot level quantization, means for transmitting a first transmission via a first channel, and means for communicating, responsive to transmitting the first transmission, a second transmission via a second channel at a quantized start timing determined in accordance with the slot level quantization.

A non-transitory computer-readable medium storing code for wireless communications by a base station is described. The code may include instructions executable by a processor to receive a report indicating a capability of a UE to support symbol level quantization, slot level quantization, or both, determine that the UE is to utilize the slot level quantization, transmit a first transmission via a first channel, and communicate, responsive to transmitting the first transmission, a second transmission via a second channel at a quantized start timing determined in accordance with the slot level quantization.

Some examples of the method, apparatuses, and non-transitory computer-readable medium described herein may further include operations, features, means, or instructions for transmitting a grant allocating a resource of the first channel for the first transmission, where the second transmission may be a feedback message for the first transmission that may be communicated via the second channel at the quantized start timing determined in accordance with the slot level quantization.

In some examples of the method, apparatuses, and non-transitory computer-readable medium described herein, transmitting the first transmission may include operations, features, means, or instructions for transmitting the first transmission that may be a grant allocating a resource of the second channel for the second transmission.

Some examples of the method, apparatuses, and non-transitory computer-readable medium described herein may further include operations, features, means, or instructions for transmitting control signaling indicating that the UE may be to utilize the slot level quantization by converting a symbol level offset to a number of slots using a ceiling function and applying a slot level offset relative to an ending symbol period of the first transmission based on the number of slots to identify the quantized start timing for the second transmission, where the second transmission may be communicated in accordance with the quantized start timing.

Some examples of the method, apparatuses, and non-transitory computer-readable medium described herein may further include operations, features, means, or instructions for transmitting control signaling indicating that the UE may be to utilize the slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission, where the second transmission may be communicated in accordance with the quantized start timing.

Some examples of the method, apparatuses, and non-transitory computer-readable medium described herein may further include operations, features, means, or instructions for determining that the UE may be to utilize the slot level quantization may be based on receiving the report indicating the capability of the UE.

In some examples of the method, apparatuses, and non-transitory computer-readable medium described herein, receiving the report may include operations, features, means, or instructions for receiving the report providing a first capability indication of the UE to support the symbol level quantization, the slot level quantization, or both, for a first bandwidth part.

In some examples of the method, apparatuses, and non-transitory computer-readable medium described herein, receiving the report may include operations, features, means, or instructions for receiving the report providing a second capability indication of the UE to support the symbol level quantization, the slot level quantization, or both, for a second bandwidth part that may be different than the first bandwidth part.

In some examples of the method, apparatuses, and non-transitory computer-readable medium described herein, receiving the report may include operations, features, means, or instructions for receiving the report providing a capability indication of the UE to support the symbol level quantization, the slot level quantization, or both, for each bandwidth part of a set of bandwidth parts.

In some examples of the method, apparatuses, and non-transitory computer-readable medium described herein, receiving the report may include operations, features, means, or instructions for receiving the report providing a first capability indication of the UE to support the slot level quantization, the symbol level quantization, or both on a first bandwidth part and a second capability indication of the UE to support the slot level quantization, the symbol level quantization, or both for a second bandwidth part.

Some examples of the method, apparatuses, and non-transitory computer-readable medium described herein may further include operations, features, means, or instructions for transmitting control signaling indicating that the UE may be to utilize the slot level quantization on a first bandwidth part and the slot level quantization or the symbol level quantization on a second bandwidth part.

Some examples of the method, apparatuses, and non-transitory computer-readable medium described herein may further include operations, features, means, or instructions for transmitting control signaling that may be radio resource control signaling, downlink control information, a medium access control (MAC) control element, or any combination thereof, indicating that the UE may be to utilize the slot level quantization.

Some examples of the method, apparatuses, and non-transitory computer-readable medium described herein may further include operations, features, means, or instructions for transmitting control signaling indicating that the UE may be to utilize the symbol level quantization, transmitting a third transmission of the first channel, and communicating, responsive to transmitting the third transmission, a fourth transmission via the second channel at a second quantized starting time determined in accordance with the symbol level quantization.

Some examples of the method, apparatuses, and non-transitory computer-readable medium described herein may further include operations, features, means, or instructions for transmitting control signaling indicating that the UE may be to apply the symbol level quantization on a first carrier and the slot level quantization on a second carrier that differs from the first carrier, where the first carrier may be a scheduling carrier for the second carrier.

Some examples of the method, apparatuses, and non-transitory computer-readable medium described herein may further include operations, features, means, or instructions for transmitting control signaling indicating that the UE may be to apply the symbol level quantization on a first carrier having a first subcarrier spacing and the slot level quantization on a second carrier having a second subcarrier spacing that may be higher than the first subcarrier spacing.

Some examples of the method, apparatuses, and non-transitory computer-readable medium described herein may further include operations, features, means, or instructions for transmitting control signaling that may be radio resource control signaling, downlink control information, a medium access control (MAC) control element, or any combination thereof, indicating which of the slot level quantization or the symbol level quantization the UE may be to utilize.

BRIEF DESCRIPTION OF THE DRAWINGS

FIG. 2 illustrates an example of a wireless communications system that supports UE timeline quantization in accordance with aspects of the present disclosure.

FIGS. 4A and 4B illustrate examples of hybrid automatic repeat request (HARQ) timing schemes that support UE timeline quantization in accordance with aspects of the present disclosure.

FIGS. 5A, 5B, and 5C illustrate examples of timeline diagrams that support UE timeline quantization in accordance with aspects of the present disclosure.

FIGS. 6A, 6B, and 6C illustrate examples of timeline diagram that support UE timeline quantization in accordance with aspects of the present disclosure.

DETAILED DESCRIPTION

Figure 1:
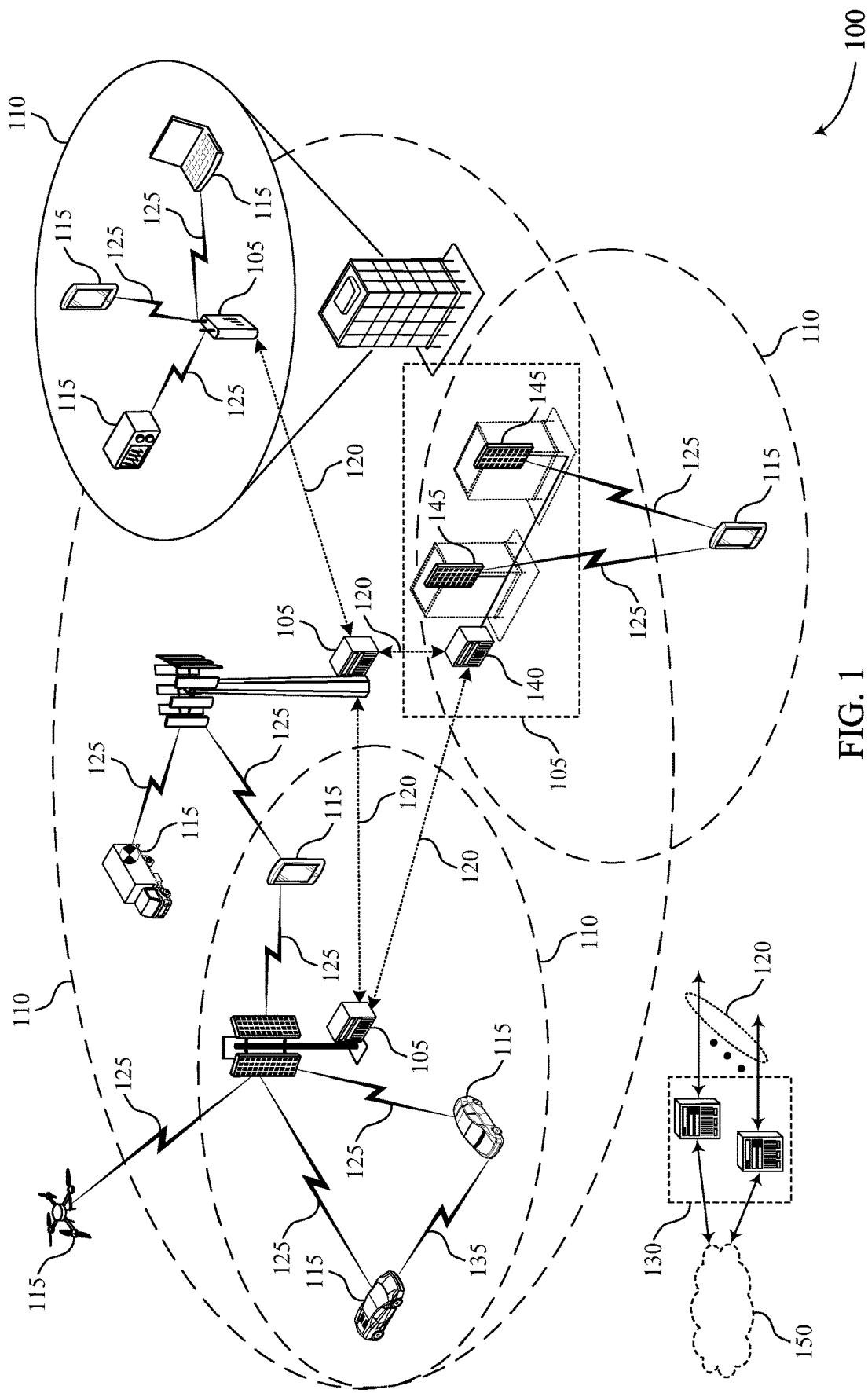
FIG. 1 illustrates an example of a wireless communications system that supports UE timeline quantization in accordance with aspects of the present disclosure.

The described techniques relate to improved methods, systems, devices, and apparatuses that support UE timeline quantization. Generally, the described techniques provide for a UE to transmit a report to a base station indicating a capability of the UE to support symbol level quantization, slot level quantization, or both. In some examples, the UE may be capable of receiving and decoding a first transmission from the base station over a time that spans a number of symbols, and transmitting a subsequent transmission. In an example, the capability of the UE may refer to a minimum time after a resource that transports the first transmission elapses, that the UE is able to transmit feedback indicating whether the UE was able to successfully decode the first transmission from the resource. In another example, the capability of the UE may refer to a minimum time after a resource that transports the first transmission elapses, that the UE is able to transmit an uplink transmission within a second resource indicated in the first transmission that includes a grant. A minimum duration of time after which the UE may receive or transmit a second transmission corresponding to the first transmission may be referred to as a timeline. Examples of first and second transmissions may include downlink data and a corresponding ACK or NACK; a transmission providing release of semi-persistent scheduling (SPS) data resources and a corresponding ACK or NACK; and an uplink grant and a corresponding uplink data transmission.

In some cases, the timeline may be quantized in terms of symbols. For instance, the minimum duration of time after which the UE may transmit or receive a second transmission may be quantized as X symbols. However, quantizing the timeline in terms of symbols may involve the UE performing operations using more resources and/or power as opposed to the methods as described herein. As one example, the process of counting which symbol the UE is to start transmitting or receiving a second transmission on may be simplified by quantizing the timeline in terms of slots, where there may be a give number of symbols to a single slot (e.g., 8 symbols to one slot, 14 symbols to one slot). By quantizing in terms of slots, the UE may forego performing operations at the symbol-level and may perform operations instead at the slot-level, which may involve the UE using fewer resources and/or operating at a lower power.

To enable slot-level quantization, the UE may convert a symbol-level offset to a slot-level offset via a ceiling operation. Upon determining the slot-level offset, the UE may transmit or receive the second transmission a number of slots later, given by the slot-level offset, from a last symbol from which the UE received the first transmission. Additionally or alternatively, the UE may apply a symbol-level timing offset to the last symbol from which the UE received the first transmission to determine a non-quantized start timing. Upon determining the non-quantized start timing, the UE may quantize the non-quantized start timing of the second transmission to the next slot boundary after the non-quantized start timing to determine a quantized start timing for transmitting or receiving the second transmission.

Aspects of the disclosure are initially described in the context of wireless communications systems. Additional aspects of the disclosure are further described in the context of an additional wireless communications system, timing schemes, HARQ timing schemes, timeline diagrams, a cross carrier timing scheme, a cross carrier scheduling timeline, a BWP configuration, and a process flow. Aspects of the disclosure are further illustrated by and described with reference to apparatus diagrams, system diagrams, and flowcharts that relate to UE timeline quantization.

FIG. 1 illustrates an example of a wireless communications system 100 that supports UE timeline quantization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

In some cases, a UE 115 may transmit, to a base station 105, a report indicating a capability of the UE 115 to support symbol level quantization, slot level quantization, or both. The UE 115 may identify that the UE 115 is to utilize the slot level quantization. For instance, the UE 115 may receive control signaling indicating that the UE 115 is to utilize slot level quantization and may perform the identifying based on receiving the control signaling. The UE 115 may receive a first transmission via a first channel and may communicate, responsive to receiving the first transmission, a second transmission via a second channel at a quantized start timing determined in accordance with the slot level quantization.

FIG. 2 illustrates an example of a wireless communications system 200 that supports UE timeline quantization in accordance with aspects of the present disclosure. In some examples, wireless communications system 200 may implement aspects of wireless communication system 100. For instance, wireless communications system may include a base station 105a, which may be an example of a base station 105 as described with reference to FIG. 1, and a UE 115a, which may be an example of a UE 115 as described with reference to FIG. 1.

Base station 105-a may transmit a downlink data transmission 205 (e.g., a PDSCH transmission) to UE 115-a over carrier 202. UE 115-a may receive the downlink data transmission 205 and may process the transmission within timeline 215. After processing the downlink data transmission, UE 115-a may transmit a feedback message 210 over carrier 202. The feedback message 210 may, for instance, be a physical uplink control channel (PUCCH) transmission such as an ACK, if UE 115-a successfully processed the downlink data transmission 205, or a NACK, if UE 115-a failed to successfully process the downlink data transmission 205.

Timeline 215 may be related to UE capability (e.g., a capability of UE 115-a) and may refer to a defined (e.g., minimum) number of symbols after the UE 115-a receives the downlink data transmission 205 that the UE 115-a is capable of transmitting the feedback message 210. Quantizing the timeline 215 within terms of a number of symbols may be referred to as symbol level quantization. Symbol level quantization may produce values within a large range. For instance, if timeline 215 spans two slots and each slot has 14 symbols, the value of the symbol level quantization of timeline 215 may be larger than 28 symbols.

Timeline quantization may occur for single carrier scheduling, cross carrier scheduling, or both. In an example, UE 115-a may receive the downlink data transmission 205 and may transmit the feedback message 210 on carrier 202, which may span a BWP and having a first SCS (e.g., 30 kHz). However, UE 115-a may receive a PDCCH scheduling the downlink data transmission 205 on a second carrier spanning a BWP and having a second SCS (e.g., 15 kHz). Processing the PDCCH scheduling the downlink data transmission 205 may involve a timeline spanning a number of symbols in the second component carrier, and processing the downlink data transmission 205 may involve timeline 215 as described herein. Both the timeline for PDCCH processing and timeline 215 may undergo symbol level quantization. More details about cross-carrier scheduling may be described with reference to FIG. 9.

Quantizing the timeline in terms of symbols may involve UE 115-a performing operations using more resources and/or power as opposed to the methods as described herein. As one example, the process of counting which symbol UE 115-a is to transmit or receive a second transmission within may be simplified by quantizing the timeline in terms of slots, where there may be a give number of symbols converted to a single slot (e.g., 8 symbols per slot, 14 symbols per slot). By quantizing in terms of slots, the UE may forego performing operations at the symbol-level and may perform operations instead at the slot-level, which may enable UE 115-a to use fewer resources, operate at a lower power, have less complex firmware or hardware for UE implementation, or any combination thereof.

In a first example, UE 115-a may convert a symbol-level offset (e.g., the value of the symbol level quantization of timeline 215) to a number of slots by a ceiling function and may then apply a slot-level offset to determine a start timing for feedback message 210. In such cases, two actions may be performed: performing a ceiling function and quantizing the result to the slot-level. More details about the first example may be described with reference to FIGS. 5A, 5B, and 5C. In a second example, UE 115-a may apply a symbol-level timing offset (e.g., the value of the symbol level quantization of timeline 215) and may quantize a start timing of scheduled data or the feedback message 210 to the next slot boundary. In such cases, two actions may be performed: shifting to the boundary of the next slot and quantizing to the slot-level. More details about the second example may be described with reference to FIGS. 6A, 6B, and 6C. Details about how the first and/or second example may be applied to cross carrier scheduling may be described with reference to FIG. 9.

In some cases, UE 115-a may support symbol-level quantization, slot-level quantization or both. To enable base station 105-a to determine what type of quantization UE 115-a supports, UE 115-a may report its capability to base station 105-a via report 220. UE 115-a may do so after accessing the network (e.g., after accessing base station 105-a via handover or a random access procedure). The message of the capability (e.g., report 220) may include the timeline quantization supporting symbol-based quantization, slot-based quantization, or support for both. If UE 115-a has multiple component carriers or BWPs over which it communicates, UE 115-a may report a capability indication for some or each of the component carriers or BWPs. For instance, UE 115-a may report that it supports symbol level quantization for a first component carrier or BWP and that it supports both symbol level quantization and slot level quantization for a second component carrier or BWP.

In the case in which UE 115-a supports both types of quantization, base station 105-a determine which type of quantization UE 115-a is to use. Base station 105-a, upon determining which type of quantization UE 115-a is to use, may deliver a message to UE 115-a of how to switch between the types of quantization. For instance, base station 105-a may transmit control signaling 225 indicating that UE 115-a is to use slot level quantization or symbol level quantization. The control signaling 225 may be semi-static control signaling (e.g., a MAC control element (MAC-CE) or radio resource control (RRC) signaling) or may be dynamic control signaling (e.g., a PDCCH transmission including downlink control information (DCI)). An indication may be added to the control signaling 225 to show how to set the timeline quantization. If UE 115-a fails to receive control signaling 225 (e.g., due to base station 105-a failing to send control signaling 225 or base station 105-a transmitting the control signaling 225 but UE 115-a failing to receive and/or decode the control signaling 225), UE 115-a may determine to use slot-based timeline quantization to monitor for corresponding channels.

If UE 115-a has multiple component carriers or BWPs over which it communicates with base station 105-a, control signaling 225 may include an indication of whether to use slot level quantization or symbol level quantization for some or each of the multiple component carriers or BWPs. As described with reference to FIG. 9, which component carrier or BWP is to have slot level quantization and which is to have symbol level quantization may be at least partially based on an SCS of the component carrier or BWP.

Performing slot-level quantization instead of symbol-level quantization may have several advantages. For instance, by quantizing in terms of slots, UE 115-a may forego performing operations at the symbol-level and may perform operations instead at the slot-level, which may enable UE 115-a to use fewer resources, operate at a lower power, have less complex firmware or hardware for UE implementation, or any combination thereof. Additionally or alternatively, slot-based quantization may produce smaller values as compared to symbol-based quantization and may not involve UE 115-a counting symbol by symbol. Additionally or alternatively, slot-based quantization may get the available scheduling portion.

Figure 3A:
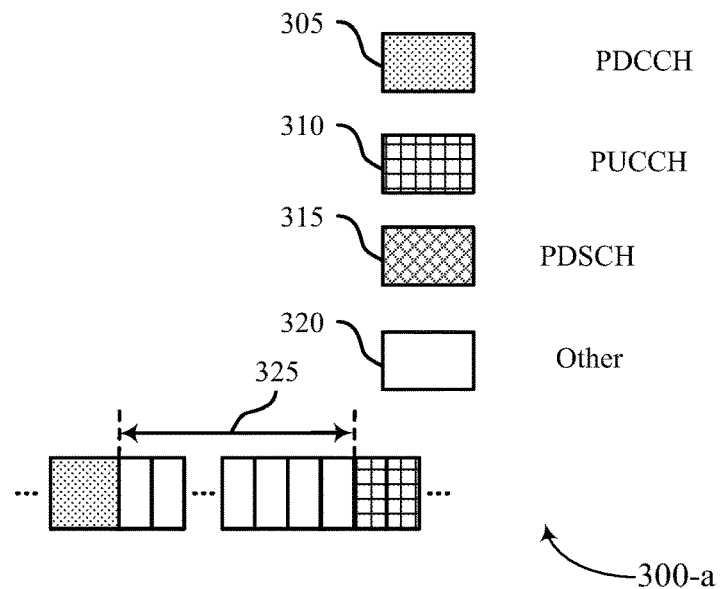
FIGS. 3A, 3B, and 3C illustrate examples of timing schemes that support UE timeline quantization in accordance with aspects of the present disclosure.
Figure 3B:
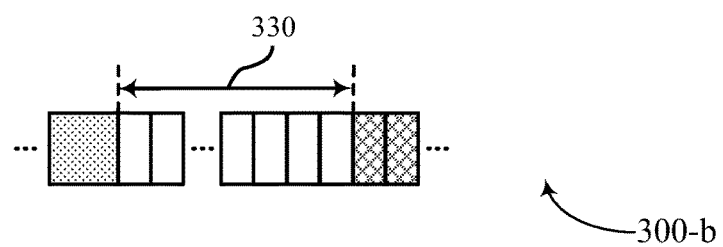
Figure 3C:
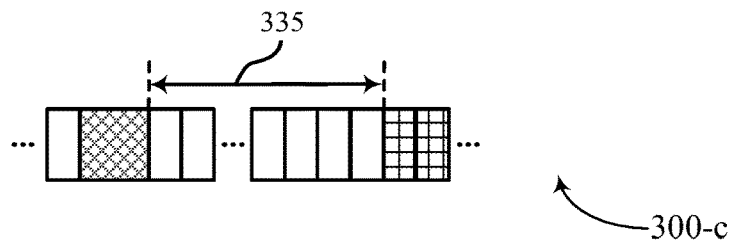

FIGS. 3A, 3B and 3C illustrate examples of timing schemes 300-a, 300-b, and 300-c that support UE timeline quantization in accordance with aspects of the present disclosure. In some examples, timing schemes 300-a, 300-b, and 300-c may be implemented by aspects of wireless communication system 100. For instance, timing schemes 300-a, 300-b, and 300-c may represent occurrences of communications between a UE 115 and a base station 105.

NR wireless communications systems may support a variety of timelines that have a symbol granularity. For instance, NR may support $N_1$, which may be a minimum UE processing time in symbols from a PDSCH to a corresponding ACK or NACK. In another example, NR may additionally or alternatively support N, which may be a minimum UE processing time in symbols from a PDCCH providing an SPS PDSCH release to a corresponding ACK or NACK. NR may support $N_2$, which may be a minimum UE processing time in symbols from PDCCH with scheduling DCI to a corresponding PUSCH or PDSCH. NR may support Z, which may be a minimum UE processing time in symbols from scheduling DCI to a corresponding PUSCH for an aperiodic channel state information (CSI) report. NR may support Z', which may be a minimum UE processing time in symbols from an aperiodic CSI-RS resource to a corresponding aperiodic CSI report.

In some cases, the timings may be related to a transmission configuration indicator (TCI) with PDCCH. One example of a timing may be a beam switching timing threshold in symbols for PDSCH reception (e.g., timeDurationForQCL). If the timing is larger than timeDurationForQCL, the reception beam information in PDCCH may not be effective in PDSCH reception. Another example of a timing may be a beam switching timing threshold in symbols for aperiodic CSI-RS reception. The timing may be used to build reception channel information effectiveness of PDSCH or CSI-RS as compared to PDCCH channel information. Examples of timelines may be described with reference to FIGS. 3A, 3B, and 3C.

NR may support the timelines described herein and the system (e.g., the network) may define tables to quantize the value of the timeline. The quantization may be based on the symbol level and may be related to a capability of the UE 115. The UE 115 may report its capability to a base station 105 (e.g., an eNB) such that the base station 105 may determine the capability of the UE 115. By using the capability, the scheduling done by the base station may meet the minimum values for UE processing (e.g., N, $N_1$, $N_2$, Z, Z').

For instance, based on different configuration and a capability of a UE 115, there may be tables including the quantized value to represent the value of $N_1$. One example of such a table is as follows, which may give PDSCH decoding time $N_1$ in terms of symbols:

TABLE 1

PDSCH processing time for PDSCH processing capability 1

| μ | Dmrs-AdditionalPosition = pos0 in DMRS-DownlinkConfig in both of dmrs-DownlinkForPDSCH-MappingTypeA, dmrs-DownlinkForPDSCH-MappingType B | Dmrs-AdditionalPosition ≠ pos0 in DMRs-DownlinkConfig in either of dmrs-DownlinkForPDSCH-MappingTypeA, dmrs-DownlinkForPDSCH-Mapping-TypeB or if the high layer parameter is not configured |
|---|---|---|
| 0 | 8 | 13 |
| 1 | 10 | 13 |
| 2 | 17 | 20 |
| 3 | 20 | 24 |

Another example of a table is as follows, which may also give PDSCH decoding time $N_1$ in terms of symbols:

TABLE 2

PDSCH processing time for PDSCH processing capability 2

| μ | Dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| 0 | 3 |
| 1 | 4.5 |
| 2 | 9 for frequency range 1 |

Among tables 1 and 2, the maximum value for $N_1$ may be 24 symbols. For FIG. 3C, the value may be, for instance, 20 symbols, where $N_1$ may be from the end of a last symbol in PDSCH to a corresponding ACK or NACK feedback. If a UE 115 reports its capability, a base station 105 (e.g., an eNB) may schedule its ACK or NACK feedback with larger $N_1$ symbol gaps.

Timing scheme 300-a may involve a UE 115 receiving a PDCCH transmission 305 with a DCI that includes SPS PDSCH release. Upon receiving the PDCCH transmission 305, the UE 115 may process the PDCCH transmission 305 during a timeline 325 before transmitting a corresponding PUCCH transmission 310 (e.g., an ACK or a NACK). In some examples, timeline 325 may be at least N symbols long. Each symbol of timeline 325 may be used for receiving or transmitting zero or more transmissions.

Timing scheme 300-b may involve a UE 115 receiving a PDCCH transmission 305 with channel information (e.g., a reception beam). Upon receiving the PDCCH transmission 305, the UE 115 may process the PDCCH transmission 305 during a timeline 330 before receiving a PDSCH transmission 315 using a beam for PDSCH reception. In some examples, timeline 330 may be at most timeDuration- ForQCL symbols long, which may enable the UE 115 to effectively use the reception beam information in the PDCCH transmission 305 for the reception of the PDSCH transmission 315. Each symbol of timeline 330 may be used for receiving or transmitting zero or more transmissions.

Timing scheme 300-c may involve a UE 115 receiving a PDSCH transmission 315. Upon receiving the PDSCH transmission 315, the UE 115 may process the PDSCH transmission 315 during a timeline 335. In some examples, timeline 335 may be at least $N_1$ symbols long. Each symbol of timeline 335 may be used for receiving or transmitting zero or more transmissions.

FIGS. 4A and 4B illustrate examples of HARQ timing schemes 400-a and 400-b that support UE timeline quantization in accordance with aspects of the present disclosure. In some examples, HARQ timing schemes 400-a and 400-b may be implemented by aspects of wireless communications system 100.

NR wireless communications systems may support a variety of timelines. For instance, $K_0$ may represent a delay in slots between a downlink grant (e.g., a downlink grant 405) and corresponding downlink data 410 reception (e.g., reception of a PDSCH transmission). $K_1$ may represent a delay in slots between reception of downlink data 410 (e.g., reception of a PDSCH transmission) and a corresponding ACK transmission on uplink (e.g., uplink transmission 420). $K_2$ may represent a delay in slots between uplink grant reception in downlink and uplink data transmission (e.g., transmission of a PUSCH). $K_3$ may represent a delay in slots between ACK or NACK reception in uplink and a corresponding retransmission of data (e.g., a retransmission over PDSCH) on downlink. One or multiple of such timelines may be used at least for a single numerology case, slot-level scheduling, and a single transmission reception point (TRxP) transmission.

$K_0$, $K_1$, $K_2$, and $K_3$ may be examples of timing parameters and may represent an actual scheduling delay. N, $N_1$, and $N_2$ may be examples of timelines and may be based on a capability of a UE 115 and may be the minimum time gap between a first symbol and a second symbol. Each of the actual scheduling may meet a timeline constraint such that the timing delay (e.g., a value of a timing parameter) is larger than the timeline constraint (e.g., a value of a corresponding timeline).

HARQ timing scheme 400-a may include symbols (e.g., OFDM symbols) for receiving a downlink grant 405, symbols for downlink data 410, symbols for a guard period 415, and symbols for a corresponding uplink transmission 420 (e.g., an ACK or NACK). In symbols 0 and/or 1, the UE 115 may receive a downlink grant (e.g., a PDCCH transmission including DCI). The UE 115 may process the downlink grant over timing delay 425, which may span symbol 2 and at least part of symbol 3 and may be an example of $K_0$ where $K_0=0$. The UE 115 may receive a corresponding downlink data transmission (e.g., a PDSCH transmission) in at least one of symbols 4 through 9. Upon finishing receiving the downlink data transmission in symbol 9, the UE 115 may process the PDSCH over timing delay 430, which may span symbols 10, 11, and 12 and may be an example of $K_1$ where $K_1=0$. Symbols 10, 11, and 12 may be used a guard period 415. The UE 115 may transmit an uplink transmission 420 (e.g., an ACK or NACK) corresponding to the downlink data transmission over symbol 13.

HARQ timing scheme 400-b may include symbols for receiving a downlink grant 405, symbols for downlink data 410, symbols for a guard period 415, and symbols for a corresponding uplink transmission 420 (e.g., a PUSCH transmission). In symbols 0 and/or 1, the UE 115 may receive an uplink grant 405 (e.g., a PDCCH transmission including uplink DCI). The UE 115 may process the uplink grant over timing delay 435, which may span symbols 2, 3 and at least part of symbol 4 and may be an example of $K_2$ where $K_2=0$. Symbols 2, 3, and 4 may be used a guard period 415. The UE 115 may transmit a corresponding uplink data transmission (e.g., a PUSCH transmission) in at least one of symbols 5 through 13.

FIGS. 5A, 5B, and 5C illustrate examples of timeline diagrams 500-a, 500-b, and 500-c that support UE timeline quantization in accordance with aspects of the present disclosure. In some examples, timeline diagrams 500-a, 500-b, and 500-c may be implemented by aspects of wireless communications system 100. For instance, timeline diagrams 500-a, 500-b, and 500-c may represent examples of communication occurrences between a base station 105 and a UE 115. The techniques described herein may quantize timeline values (e.g., $N_1$, $N_2$) to slot level.

Timeline diagram 500-a may illustrate two slots 502-a and 502-b each containing 14 OFDM symbol periods. Over symbol periods 2 and 3 and at least a portion of symbol period 4 of slot 502-a, a UE 115 may receive a data transmission (e.g., PDSCH transmission 505-a) from a base station 105. Symbol period 4 of slot 502-a, being the last symbol period over which the UE 115 received the PDSCH transmission 505-a, may be considered the ending symbol period of PDSCH transmission 505-a. The UE 115 may apply a symbol level offset 520-a, which may span 7 symbol periods in the present example, relative to the ending symbol period of PDSCH transmission 505-a to identify a symbol-level quantized start timing of symbol period 12 of slot 502-a. Accordingly, the UE 115 may transmit a feedback message corresponding to PDSCH transmission 505-a, such as ACK/NACK 510-a, starting at symbol period 12 of slot 502-a. In the present example, the UE 115 may transmit ACK/NACK 510-a over symbol period 12 of slot 502-a.

Timeline diagram 500-b may illustrate two slots 502-c and 502-d each containing 14 OFDM symbol periods. Over symbol periods 2 and 3 and at least a portion of symbol period 4 of slot 502-c, a UE 115 may receive a data transmission (e.g., PDSCH transmission 505-b) from a base station 105. The UE 115 may identify a symbol level offset of 7 symbols (e.g., the symbol level offset 520-a of timeline diagram 500-a) and may convert the symbol level offset to a number of slots (i.e., a slot level offset 525-a) using a ceiling function, which may relax the actual timeline to slot-level granularity. For instance, the UE 115 in the present example may calculate ceiling $((7/14),1)=1$ slot where 7 corresponds to the symbol level offset and 14 corresponds to the number of OFDM symbol periods in a slot 502. Upon converting the symbol level offset to the number of slots 502, the UE 115 may apply the slot level offset to identify a slot-level quantized start timing of symbol period 5 of slot 502-d. Accordingly, the UE 115 may transmit a feedback message corresponding to PDSCH transmission 505-b, such as ACK/NACK 510-b, starting at symbol period 5 of slot 502-d. In the present example, the UE 115 may transmit ACK/NACK 510-b over symbol period 5 of slot 502-d.

In some cases, the symbol-level timeline (e.g., the symbol-level offset) may be equal to a length of a slot 502 (e.g., 14 symbol periods in the present example). In such cases, the ceiling function and the symbol-level offset may result in the same offset of 1 slot that is equivalent to 14 symbol periods. Such a case may not involve timeline relaxation as the slot quantization and the symbol-level offset may result in the same offset being applied.

Timeline diagram 500-c may illustrate multiple slots 502 (e.g., slots 502-e, 502-f, and 502-g) each containing 14 OFDM symbol periods. Over symbol periods 2 and 3 and at least a portion of symbol period 4 of slot 502-e, a UE 115 may receive a data transmission (e.g., PDSCH transmission 505-c) from a base station 105. The UE 115 may identify a symbol level offset of M symbol periods and may convert the symbol level offset to a number of slots 502 (i.e., a slot level offset 525-b) using a ceiling function, which may relax the actual timeline to slot-level granularity. For instance, the UE 115 in the present example may calculate ceiling ((M/14),1)=Q slots where M corresponds to the symbol level offset and 14 corresponds to the number of OFDM symbol periods in a slot 502. Upon converting the symbol level offset to the number of slots 502, the UE 115 may apply the slot level offset to identify a slot-level quantized start timing of symbol period 5 of the (Q+1)th slot 502 (e.g., slot 502-g). Accordingly, the UE 115 may transmit a feedback message corresponding to PDSCH transmission 505-b, such as ACK/NACK 510-c, starting at symbol period 5 of the (Q+1)th slot 502 (e.g., slot 502-g). In the present example, the UE 115 may transmit ACK/NACK 510-b over symbol period 5 of the (Q+1)th slot 502 (e.g., slot 502-g).

In some cases, the symbol-level timeline (e.g., the symbol-level offset) may be equal to a multiple of a length of a slot 502 (e.g., 14n symbol periods in the present example, where n is a whole number). In such cases, the UE 115 performing the ceiling function and the symbol-level offset may result in the same offset. Such a case may not involve timeline relaxation. For example, when a subcarrier spacing is 30 kHz, there are 14 symbols per slot. When the symbol-level timeline is equal to 14*n, n=1, 2, 3 . . . slot-level quantization and the symbol-level offset may result in the same offset being applied.

FIGS. 6A, 6B, and 6C illustrate examples of timeline diagrams 600-a, 600-b, and 600-c that support UE timeline quantization in accordance with aspects of the present disclosure. In some examples, timeline diagrams 600-a, 600-b, and 600-c may be implemented by aspects of wireless communications system 100. For instance, timeline diagrams 600-a, 600-b, and 600-c may represent examples of communication occurrences between a base station 105 and a UE 115.

Timeline diagram 600-a may illustrate two slots 602-a and 602-b each containing 14 OFDM symbol periods. Over symbol periods 2 and 3 and at least a portion of symbol period 4 of slot 602-a, a UE 115 may receive a data transmission (e.g., PDSCH transmission 605-a). Symbol period 4 of slot 602-a, being the last symbol period over which the UE 115 received the PDSCH transmission 605-a, may be considered the ending symbol period of PDSCH transmission 605-a. The UE 115 may apply a symbol level offset 620-a, which may span 7 symbol periods in the present example, relative to the ending symbol period of PDSCH transmission 605-a to identify a symbol-level quantized start timing of symbol period 12 of slot 602-a. Accordingly, the UE 115 may transmit a feedback message corresponding to PDSCH transmission 605-a, such as ACK/NACK 610, starting at symbol 12 of slot 602-a. In the present example, the UE 115 may transmit ACK/NACK 610 over symbol period 12 of slot 602-a.

Timeline diagram 600-b may illustrate two slots 602-c and 602-d each containing 14 OFDM symbol periods. Over symbol periods 2 and 3 and at least a portion of symbol period 4 of slot 602-c, a UE 115 may receive a data transmission (e.g., PDSCH transmission 605-b) from a base station 105. The UE 115 may identify a symbol level offset of 7 symbols (e.g., the symbol level offset 620-a of timeline diagram 600-a) and may apply the symbol level offset for determining a non-quantized start timing within slot 602-c for the feedback message relative to the ending symbol period of the PDSCH transmission 605-b. For instance, in the present example, the UE 115 may determine a non-quantized start timing of symbol 12 of slot 602-c. The UE 115 may quantize the non-quantized start timing to a boundary of the next slot 602 after 602-c to identify a slot-level quantized start timing. In the present example, the next slot 602 after slot 602-c may be slot 602-d and the quantized start timing may be symbol period 1 of slot 602-d. Accordingly, the UE 115 may transmit a feedback message corresponding to PDSCH transmission 605-b, such as ACK/NACK 610-b, starting at symbol period 1 of slot 602-d. In the present example, the UE 115 may transmit ACK/NACK 610-b in symbol period 1 of slot 602-d.

In some cases, the symbol-level timeline (e.g., the symbol-level offset) may be such that applying the symbol-level offset to the ending symbol period would result in a non-quantized start timing of symbol period 1 in slot 602-d (e.g., if the symbol-level offset is equal to 10). In such cases, symbol level offset and the quantized start timing may result in the same offset (e.g., to the slot boundary between slots 602-c and 602-d) to the slot level. Such a case may not involve timeline relaxation as the UE 115 as symbol level offset and the quantized start timing may result in the same offset.

Timeline diagram 600-c may illustrate multiple slots 602 (e.g., slots 602-e, 602-f, 602-g, and 602-h) each containing 14 OFDM symbol periods. Over symbol periods 2 and 3 and at least a portion of symbol period 4 of slot 602-e, a UE 115 may receive a data transmission (e.g., PDSCH transmission 605-c) from a base station 105. The UE 115 may identify a symbol level offset of M symbol periods and may apply the symbol level offset for determining a non-quantized start timing for the feedback message relative to the ending symbol period of the PDSCH transmission 605-b. For instance, in the present example, the UE 115 may determine a non-quantized start timing of symbol mod(M+4,14)+1 of slot $$\text{floor}\left(\frac{M+4+1}{14}, 1\right)$$

(e.g., of slot 602-g), where mod may represent a modulo function whose divisor is the number of symbols in a slot 602 (e.g., 14) and where floor may represent a floor function. The UE 115 may quantize the non-quantized start timing to a boundary of slot $$\text{floor}\left(\frac{M+4+1}{14}, 1\right)+1$$

e.g., slot but-h) to identify a quantized start timing. Accordingly, the UE 115 may transmit a feedback message corresponding to PDSCH transmission 605-c, such as ACK/NACK 610-c, starting at symbol period 1 of the $$\left(\text{floor}\left(\frac{M+4+1}{14}, 1\right)+1\right)th$$

slot 602 (e.g., slot 602-*h*). In the present example, the UE 115 may transmit ACK/NACK 610-*b* over symbol period 1 of the (floor(M+4+1, 14)+1)th slot 602 (e.g., slot 602-*h*).

In some cases, the symbol-level timeline (e.g., the symbol-level offset) may be such that applying the symbol-level offset to the ending symbol period would result in a non-quantized start timing of symbol period 1 in the $$\left(\text{floor}\left(\frac{M+4+1}{14}, 1\right)\right)th$$

slot (e.g., if the symbol-level offset M is equal to (14n+10), where n is a whole number). In such cases, the non-quantized start timing may be the same as the slot-level quantized start timing resulting in the same offset. Such a case may not involve timeline relaxation as the UE 115.

Figure 7:
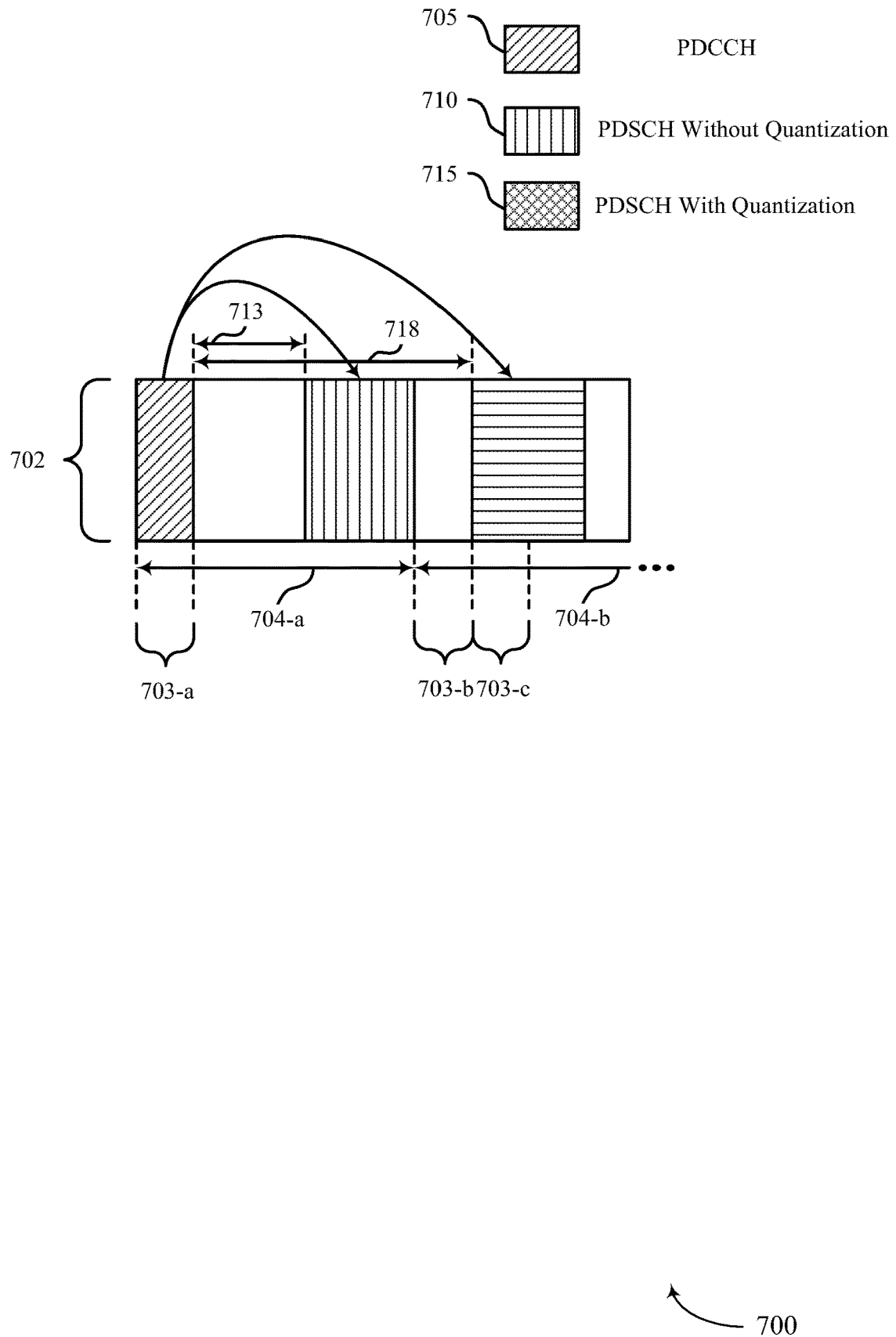
FIG. 7 illustrates an example of a timing scheme that supports UE timeline quantization in accordance with aspects of the present disclosure.

FIG. 7 illustrates an example of a timing scheme 700 that supports UE timeline quantization in accordance with aspects of the present disclosure. In some example, timing scheme 700 may implement aspects of wireless communications system 100. For instance, timing scheme 700 may represent communications between a UE 115 and a base station 105. Each of the slots 704 in the present example may have 8 symbols 703.

A UE 115 may communicate with a base station 105 over carrier 702. For instance, the UE 115 may receive a PDCCH transmission 705, which may schedule a PDSCH transmission, in slot 704-*a*. If refraining from performing slot-level quantization, the UE 115 may transmit PDSCH transmission 710 after timeline 713 elapses. Timeline 713 may be an example of $N_2$ as described with reference to FIGS. 3A, 3B, and 3C.

If performing slot-level quantization, the UE 115 may perform slot-level quantization on $N_2$, such as described with reference to FIGS. 6B and 6C. For example, the slot of the second channel/signal (e.g., PDSCH, feedback signal) may be quantized to the next slot boundary of the second channel/signal. However, in some cases, carrier 702 may have a fixed pattern. For instance, the first symbol 703 in each slot 704 (e.g., symbol 703-*a* for slot 704-*a* and 703-*b* for slot 704-*b*) may be for receiving a PDCCH transmission 705. As such, a PDSCH transmission corresponding to PDCCH transmission 705 may not be set to start in symbol 703-*b*, even though symbol 703-*b* is the first symbol 703 of slot 704-*b*. Instead, $N_2$ quantized timeline 718 may be set such that PDSCH transmission 715 may be transmitted starting at a symbol 703 directly after symbol 703-*b* (e.g., symbol 703-*c*). The next slot boundary may be boundary of the next available portion in the next slot 704. In the present example, the next slot 704 may be slot 704-*b* and the available portion may begin at symbol 703-*c*.

Figure 8:
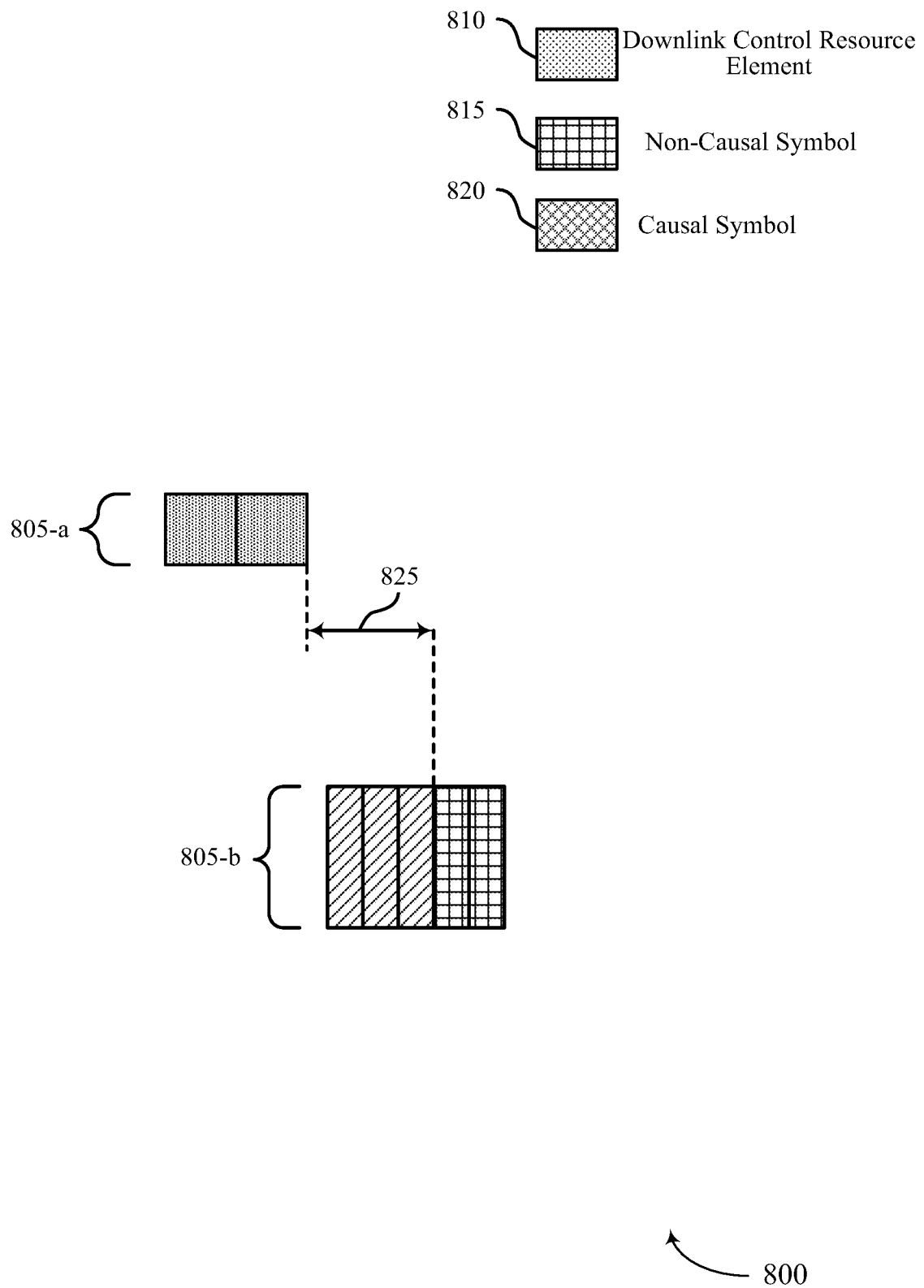
FIG. 8 illustrates an example of a cross carrier timing scheme that supports UE timeline quantization in accordance with aspects of the present disclosure.

FIG. 8 illustrates an example of a cross carrier timing scheme 800 that supports UE timeline quantization in accordance with aspects of the present disclosure. In some examples, cross carrier timing scheme 800 may implement aspects of wireless communication system 100. For instance, cross carrier timing scheme 800 may represent communications between a UE 115 and a base station 105.

At least for the case of a lower SCS PDSCH scheduling a higher SPS PDSCH, the earliest possible starting point for receiving a PDSCH may be defined by an end of the PDCCH plus Δ. Δ may depend on multiple factors influenced by UE implementation. As such, it may be preferable to support determination of Δ based on a UE capability report.

One or multiple of a variety of PDCCH monitoring scenarios may occur for wireless devices supporting NR. For instance, a UE 115 may use slot-based scheduling which may involve PDCCH monitoring at a beginning of a slot. Additionally or alternatively, the UE 115 may perform a shifted version of the above monitoring (e.g., monitoring at the beginning of the slot). The UE 115 may do so if the SCS has a particular value (e.g., 15 kHz). Additionally or alternatively, the UE 115 may perform non-slot-based (e.g., symbol based) scheduling that enables PDCCH transmission anywhere within the slot.

Cross carrier timing scheme 800 may involve the UE 115 having two carriers 805-*a* and 805-*b*. Carrier 805-*a* may have a first SCS (e.g., 15 kHz) and carrier 805-*b* may have a second SCS (e.g., 30 kHz). The UE 115 may receive a PDCCH transmission using downlink control resource elements 810 and may have a PDCCH processing delay 825 for processing the PDCCH transmission. The processing delay may be given by Δ. Symbols of carrier 805-*b* which occur before or during the PDCCH processing delay 825 may be non-causal symbols 815 and those which occur after may be causal symbols 820. The non-causal symbols 815 depicted here may be for $K_0=0$, as buffering may be used for the PDCCH processing delay 825. Other details about $K_0=0$ may be described with reference to FIG. 4. The UE 115 may receive a PDSCH transmission over carrier 805-*b* during the causal symbols 820.

Figure 9:
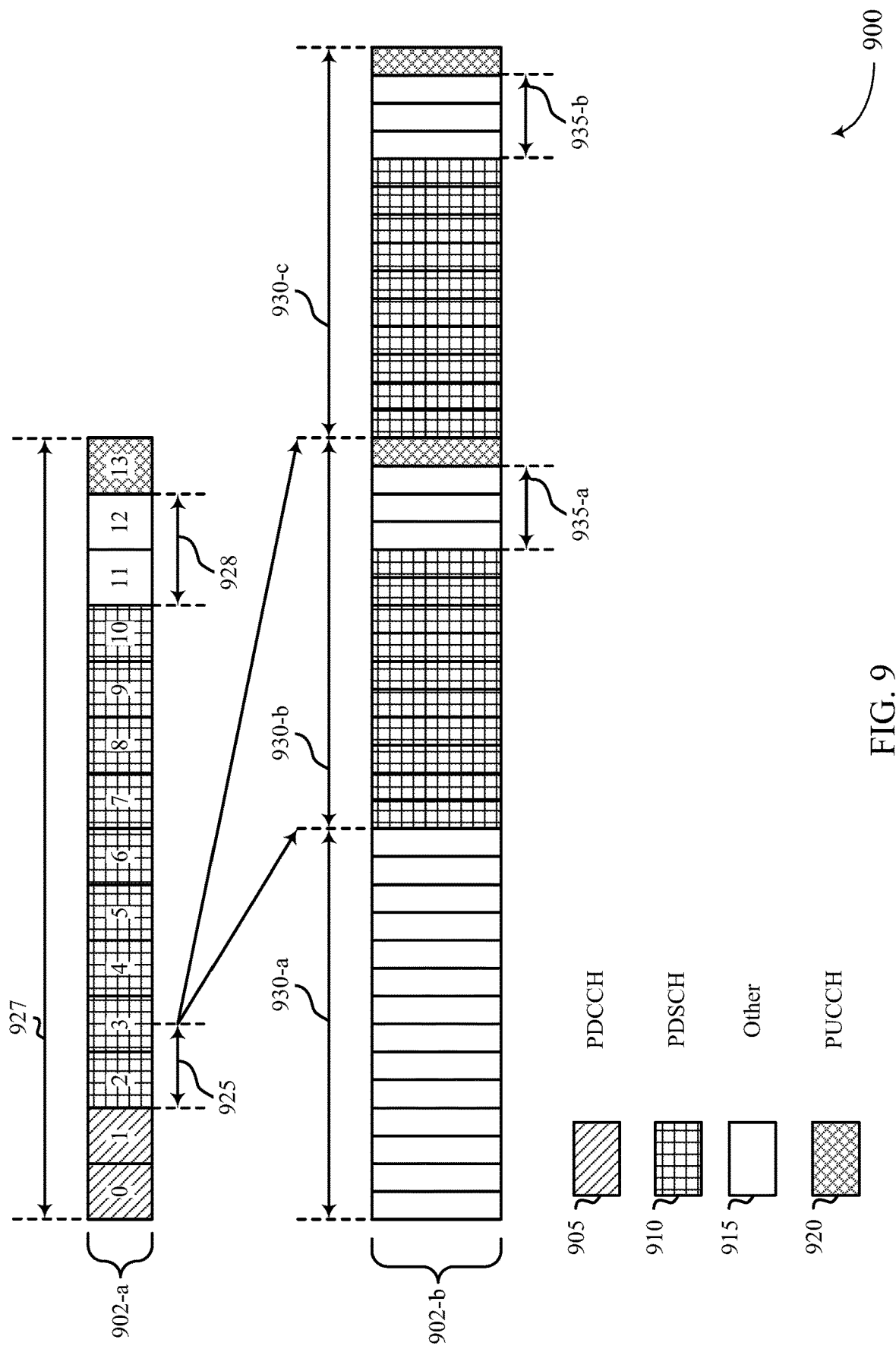
FIG. 9 illustrates an example of a cross carrier scheduling timeline that supports UE timeline quantization in accordance with aspects of the present disclosure.

FIG. 9 illustrates an example of a cross carrier scheduling timeline 900 that supports UE timeline quantization in accordance with aspects of the present disclosure. In some examples, cross carrier scheduling timeline 900 may be implemented by aspects of wireless communication system 100. For instance, cross carrier scheduling timeline 900 may represent examples of communication occurrences between a base station 105 and a UE 115.

A UE 115 may communicate according to component carriers 902-*a* and 902-*b*. Component carrier 902-*a* may have a smaller SCS (e.g., 15 kHz) as compared to component carrier 902-*b* (e.g., 30 kHz), but may have a larger symbol period duration as compared to component carrier 902-*b*. For instance, the SCS of component carrier 902-*a* may be half that of component carrier 902-*b* and the symbol period duration of component carrier 902-*a* may be twice that of component carrier 902-*b*. Accordingly, the length of a slot for component carrier 902-*a* (e.g., slot 927) may be twice that of the length of a slot for component carrier 902-*b* (e.g., a slot 930). The slots 930 for component carrier 902-*b* may correspond to different values of $K_0$ (e.g., slot 930-*a* may correspond to $K_0=0$, slot 930-*b* may correspond to $K_0=1$, and slot 930-*c* may correspond to $K_0=2$), where $K_0$ may be as described with reference to FIGS. 4 and/or 8.

During symbol periods 0 and 1 of slot 927, the UE 115 may receive a PDCCH transmission 905 from a base station 105. The UE 115 may process the PDCCH transmission 905 over PDCCH processing delay 925. Upon finishing processing the PDCCH transmission 905, the UE 115 may determine that it is to receive a first PDSCH transmission 910 in slot 930-*b* and a second PDSCH transmission 910 in slot 930-*c*.

Upon receiving the first PDSCH transmission 910 over component carrier 902-*b* in slot 930-*b*, the UE 115 may process the PDSCH transmission 910 according to timeline 935-*b*, which may span 3 symbols of slot 930-*b*, and may transmit a PUCCH transmission 920 for the first PDSCH transmission 910 in slot 930-*b*. Similarly, upon receiving the second PDSCH transmission 910 over component carrier 902-*b* in slot 930-*c*, the UE 115 may process the second PDSCH transmission 910 according to timeline 935-b, which may span 3 symbols of slot 930-c, and may transmit a PUCCH transmission 920 for the second PDSCH transmission 910 in slot 930-c.

Additionally, the UE 115 may receive a third PDSCH transmission 910 over component carrier 902-a in slot 927 over symbols periods 2 to 10. The third PDSCH transmission 910 may have been scheduled by a previous PDCCH transmission 905 (not depicted). Upon receiving the third PDSCH transmission 910 over component carrier 902-a in slot 927, the UE 115 may process the PDSCH transmission 910 according to timeline 928, which may span 2 symbols of slot 927, and may transmit a PUCCH transmission 920 for the third PDSCH transmission 910.

In some cases, one or both of component carriers 902-a and 902-b may be configured to perform slot-level quantization. In one example, component carrier 902-a may be configured to perform symbol-level quantization and component carrier 902-b may be configured to perform slot level quantization. In such cases, timelines 935-a and 935-b may be adjusted such that the corresponding PUCCH transmissions 920 are transmitted in a next slot as described with respect to FIGS. 6B and 6C or may be converted to a slot-level timeline as described with reference to FIGS. 5B and 5C.

In some cases, the timeline quantization setting may be scheduling dependent. For instance, a scheduling carrier (e.g., component carrier 902-a) may be configured with a symbol level quantization while a scheduled carrier (e.g., component carrier 902-b) may be configured with a slot level quantization. Additionally or alternatively, the component carrier 902 with a lower SCS among two or more component carriers 902 or a SCS below a threshold (e.g., component carrier 902-a) may be configured with a symbol-level quantization and the component carrier 902 with a higher SCS among two or component carriers or an SCS above a threshold (e.g., component carrier 902-b) may be configured with slot level quantization.

Figure 10:
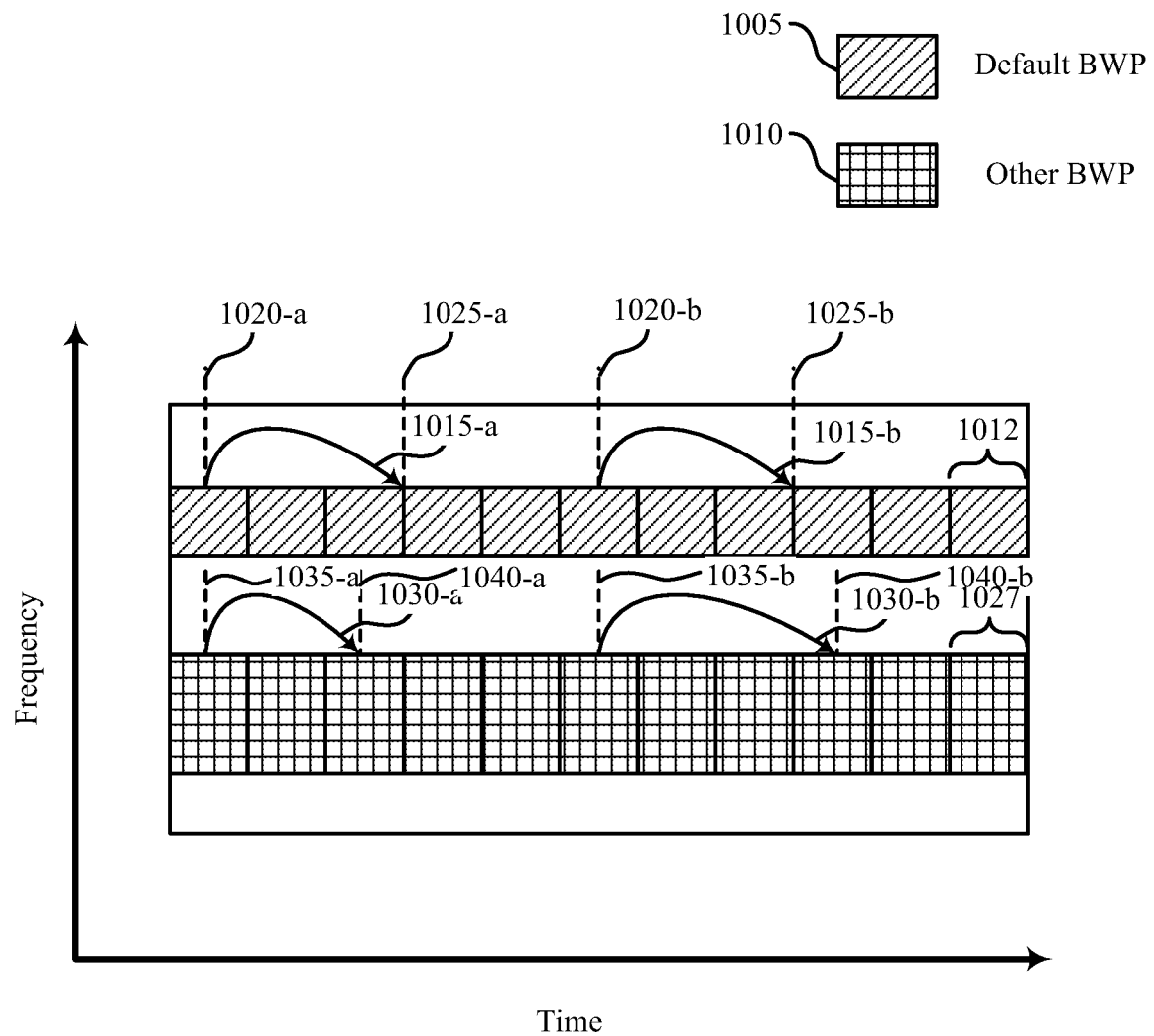
FIG. 10 illustrates an example of a bandwidth part (BWP) configuration that supports UE timeline quantization in accordance with aspects of the present disclosure.

FIG. 10 illustrates an example of a BWP configuration 1000 that supports UE timeline quantization in accordance with aspects of the present disclosure. In some examples, BWP configuration 1000 may be implemented by aspects of wireless communication system 100. For instance, BWP configuration 1000 may represent BWPs used by a UE 115 and a base station 105 to perform communications.

In some cases, a UE 115 may communicate with a base station 105 over multiple BWPs, which may include a default BWP 1005 as well as other BWPs 1010. The quantization applied for each of these BWPs may depend on the BWP and may be indicated in control signaling (e.g., control signaling 225 as described with reference to FIG. 2, which may be a MAC-CE, an RRC message, or a PDCCH DCI). In one example, each BWP may have an independent indication to select the timeline quantization mode. For instance, the control signaling may include a first indication for a first BWP, a second indication for a second BWP, and so on. Additionally or alternatively, each of the BWPs may share a same indication for selecting the timeline quantization mode. For instance, the control signaling may include a single indication to perform slot-level quantization, which may be applied each BWP.

In some cases, whichever BWP is the initial downlink BWP or the default BWP 1005 may support slot-based timeline quantization, and the other BWPs 1010 may support symbol-based timeline quantization. In such cases, a UE 115 may determine which type of quantization to apply without receiving control signaling. Additionally or alternatively, whichever BWP is the initial downlink BWP or default BWP 1005 may support slot-based timeline quantization, and the other BWPs 1010 may support symbol-based and slot-based quantization based on configuration (e.g., a configuration provided by control signaling with independent values for each of the other BWPs 1010 or with a single value for each of the other BWPs 1010).

In one example, as depicted in FIG. 10, a UE 115 may communicate over a default BWP 1005 and another BWP 1010, where the default BWP 1005 and the other BWP 1010 may use slot-level timeline quantization. As described herein, the UE 115 may have received control signaling that independently configured the default BWP 1005 and the other BWP 1010 with slot-level quantization or that configured the default BWP 1005 and the other BWP 1010 with slot-level quantization with a single value. Additionally or alternatively, the UE 115 may have been preconfigured to use slot-level timeline quantization for the default BWP 1005 and the other BWP 1010. Additionally or alternatively, the UE 115 may have been preconfigured to use slot-level timeline quantization for the default BWP 1005, but may receive control signaling that configured the other BWP 1010 with slot-level timeline quantization.

At 1020-a, the UE 115 may finish receiving a first downlink data transmission and may process the first downlink data transmission over timeline 1015-a. At 1025-a, the UE 115 may start transmitting a first feedback message. Similarly, at 1020-b, the UE 115 may finish receiving a second downlink data transmission and may process the second downlink data transmission over timeline 1015-b. At 1025-b, the U 115 may start transmitting a second feedback message. The starting symbol for transmission of the first and second feedback messages may be the starting symbol of the corresponding slot 1012. The methods that UE 115 may use to perform slot-level quantization for the default BWP 1005 may be as described with reference to FIGS. 6B and 6C.

At 1035-a, the UE 115 may finish receiving a first downlink data transmission and may process the first downlink data transmission over timeline 1030-a. At 1040-a, the UE 115 may start transmitting a first feedback message. Similarly, at 1035-b, the UE 115 may finish receiving a second downlink data transmission and may process the second downlink data transmission over timeline 1030-b. At 1040-b, the UE 115 may start transmitting a second feedback message. The starting symbol for transmission of the first and second feedback messages may be one symbol greater than the finishing symbol for the first and second downlink data transmissions, respectively, within respective slots 1027. The methods that UE 115 may use to perform slot-level quantization for other BWP 1010 may be as described with reference to FIGS. 5B and 5C.

Figure 11:
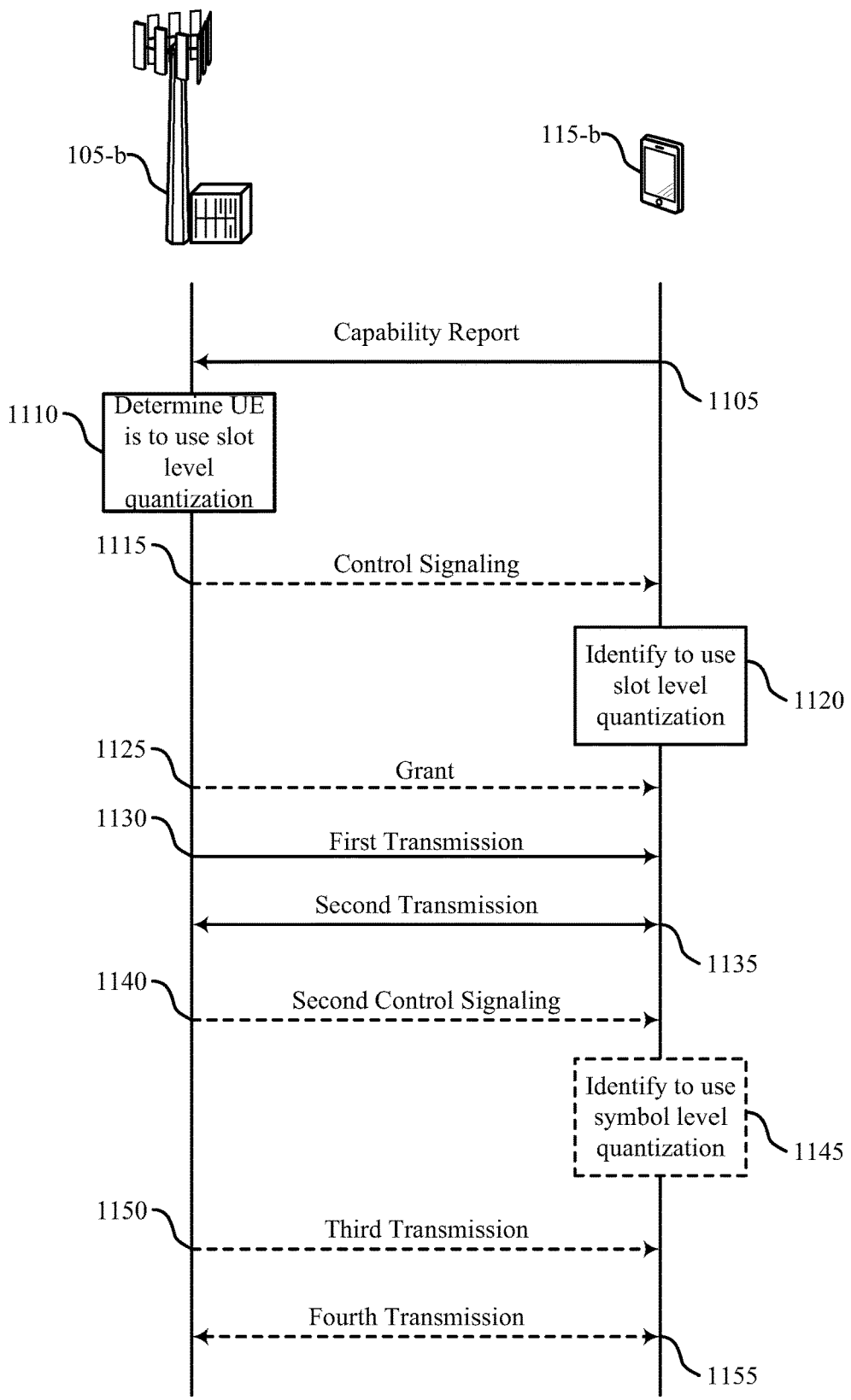
FIG. 11 illustrates an example of a process flow that supports UE timeline quantization in accordance with aspects of the present disclosure.

FIG. 11 illustrates an example of a process flow 1100 that supports UE timeline quantization in accordance with aspects of the present disclosure. In some examples, process flow 1100 may implement aspects of wireless communication system 100. For instance, process flow 1100 may include base station 105-b, which may be an example of a base station 105 as described with reference to FIG. 1, and a UE 115-b, which may be an example of a UE 115 as described with reference to FIG. 1.

At 1105, UE 115-b may transmit a report indicating a capability of UE 115-b to support symbol level quantization, slot level quantization or both. In some cases, the report may provide a first capability indication of UE 115-b to support symbol level quantization, slot level quantization, or both, for a first bandwidth part. Additionally, the report may provide a second capability indication of UE **115-*b* to support symbol level quantization, slot level quantization, or both, for a second bandwidth part that is different than the first bandwidth part. In some cases, the report may provide a capability indication of UE 115-*b* to support symbol level quantization, slot level quantization, or both, for each bandwidth part of a set of bandwidth parts. In some cases, the report may provide a first capability indication of UE 115-*b* to support slot level quantization, symbol level quantization, or both, on a first bandwidth part and a second capability indication of UE 115-*b*** to support symbol level quantization, slot level quantization, or both, on a second bandwidth part.

At 1110, base station **105-*b* may determine that UE 115-*b* is to utilize slot level quantization. In some cases, determining that UE 115-*b* is to use slot level quantization may be based on receiving the report indicating the capability of UE 115-*b* at 1105**.

At 1115, base station **105-*b* may transmit control signaling indicating that UE 151-*b* is to utilize slot level quantization to identify a quantized start timing. For instance, the control signaling may indicate for UE 115-*b* to utilize slot level quantization by converting a symbol level offset to a number of slots using a ceiling function and applying a slot level offset relative to an ending symbol period of a first transmission based on the number of slots to identify a quantized start timing for a second transmission. Additionally or alternatively, the control signaling may indicate that UE 115-*b* is to utilize slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission. UE 115-*b* may receive the control signaling. In some cases, the control signaling may indicate that UE 115-*b*** is to utilize slot level quantization on a first bandwidth part and slot level quantization or symbol level quantization on a second bandwidth part.

In some cases, the control signaling may indicate that UE **115-*b* is to apply symbol level quantization on a first carrier and slot level quantization on a second carrier that differs from the first carrier, where the first carrier is a scheduling carrier for the second carrier. In some cases, the control signaling may indicate that UE 115-*b* is to apply symbol level quantization on a first carrier having a first subcarrier spacing and slot level quantization on a second carrier having a second subcarrier spacing that is higher than the first subcarrier spacing. In some cases, the control signaling may be RRC signaling, DCI, a MAC CE, or any combination thereof, indicating which of slot level quantization or symbol level quantization UE 115-*b*** is to utilize.

At 1120, UE **115-*b* may identify that UE 115-*b* is to utilize the slot level quantization. In some cases, identifying that UE 115-*b* is to use the slot level quantization may be based on a determination that control signaling (e.g., control signaling indicating which of symbol level quantization or slot level quantization to use), has not been received in response to transmission of the report. One such scenario may be, for instance, if UE 115-*b* does not receive the control signaling transmitted at 1115. In some cases, identifying that UE 115-*b* is to utilize the slot level quantization involves UE 115-*b* receiving control signaling that is RRC signaling, DCI, a MAC-CE, or any combination thereof, indicating that UE 115-*b* is to utilize the slot level quantization (e.g., such as described at 1115**).

At 1125, base station **105-*b* may transmit a grant allocating a resource of a first channel for a first transmission. UE 115-*b*** may receive the grant.

At 1130, base station **105-*b* may transmit the first transmission via a first channel. UE 115-*b* may receive the first transmission. In some cases, the first transmission may be a grant allocating a resource of a second channel for the second transmission. If UE 115-*b*** received the grant allocating the resource of the first channel for the first transmission, the first transmission may be a shared channel transmission.

At 1135, UE **115-*b* may communicate, with base station 105-*b* and responsive to receiving the first transmission, a second transmission via a second channel at a quantized start timing determined in accordance with the slot level quantization and/or with the quantized start timing. If UE 115-*b* receives the grant at 1125**, the second transmission may be a feedback message for the first transmission that is communicated via the second channel at the quantized start timing determined in accordance with the slot level quantization.

At 1140, base station **105-*b* may transmit control signaling indicating that UE 115-*b* is to utilize symbol-level quantization. UE 115-*b*** may receive the control signaling.

At 1145, UE **115-*b* may identify that UE 115-*b*** is to utilize the symbol level quantization.

At 1150, base station **105-*b* may transmit a third transmission on the first channel. UE 115-*b*** may receive the third transmission on the first channel.

At 1155, UE **115-*b* may communicate, with base station 105-*b*** and responsive to receiving the third transmission, a fourth transmission via the second channel at a second quantized starting time determined in accordance with the symbol level quantization.

Figure 12:
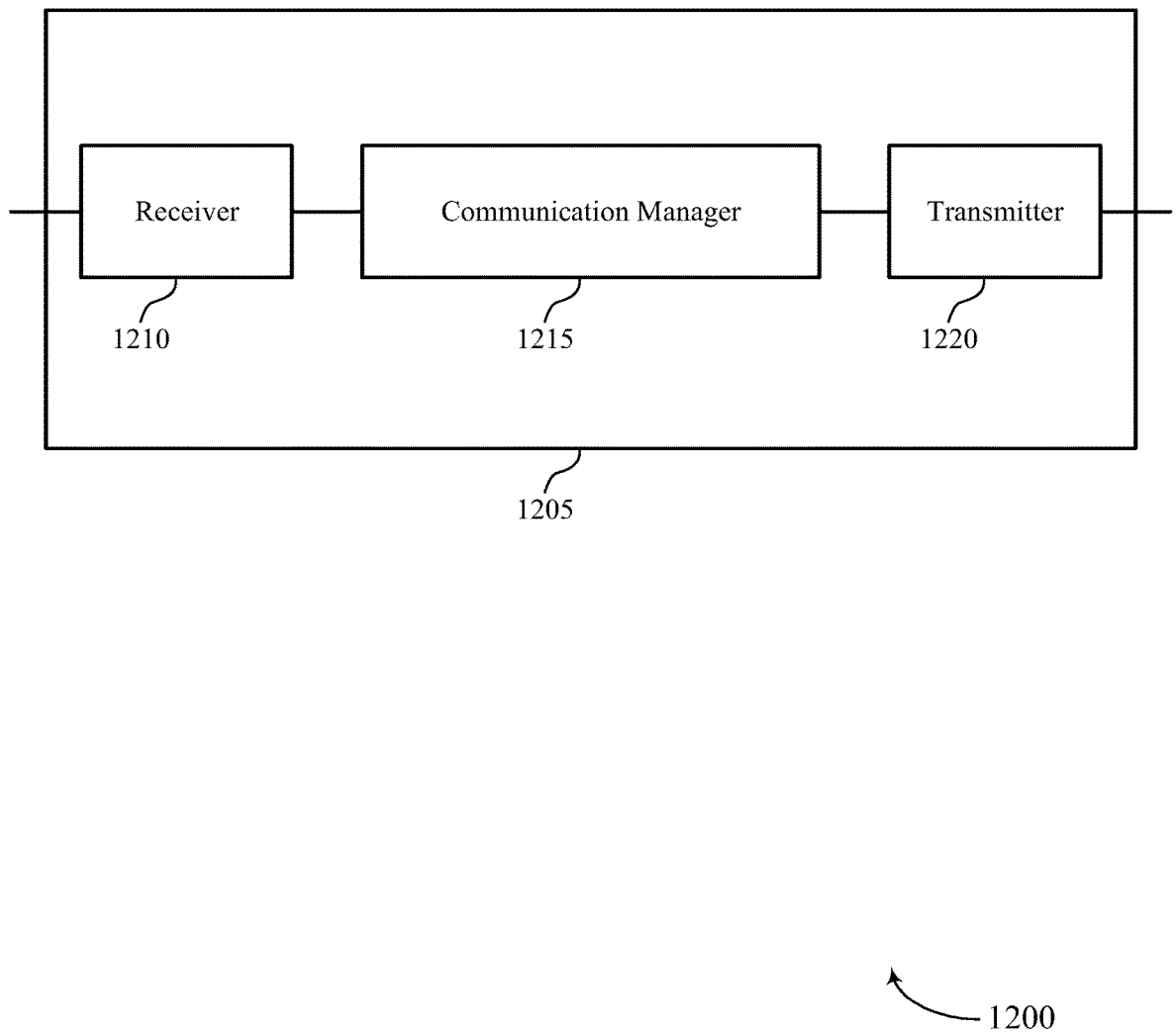
FIGS. 12 and 13 show diagrams of devices that support UE timeline quantization in accordance with aspects of the present disclosure.

FIG. 12 shows a diagram 1200 of a device 1205 that supports UE timeline quantization in accordance with aspects of the present disclosure. The device 1205 may be an example of aspects of a UE 115 as described herein. The device 1205 may include a receiver 1210, a communication manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to UE timeline quantization, etc.). Information may be passed on to other components of the device 1205. The receiver 1210 may be an example of aspects of the transceiver 1515 described with reference to FIG. 15. The receiver 1210 may utilize a single antenna or a set of antennas.

The communication manager 1215 may identify that the UE is to utilize the slot level quantization, transmit a report indicating a capability of the UE to support symbol level quantization, slot level quantization, or both, receive a first transmission via a first channel, and communicate, responsive to receiving the first transmission, a second transmission via a second channel at a quantized start timing determined in accordance with the slot level quantization. The communication manager 1215 may be an example of aspects of the communication manager 1510 described herein.

The communication manager 1215, or its sub-components, may be implemented in hardware, code (e.g., software or firmware) executed by a processor, or any combination thereof. If implemented in code executed by a processor, the functions of the communication manager 1215, or its subcomponents may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1215, or its sub-components, may be physically located at various positions, including being distributed such that portions of functions are implemented at different physical locations by one or more physical components. In some examples, the communication manager 1215, or its sub-components, may be a separate and distinct component in accordance with various aspects of the present disclosure. In some examples, the communication manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1515 described with reference to FIG. 15. The transmitter 1220 may utilize a single antenna or a set of antennas.

Figure 13:
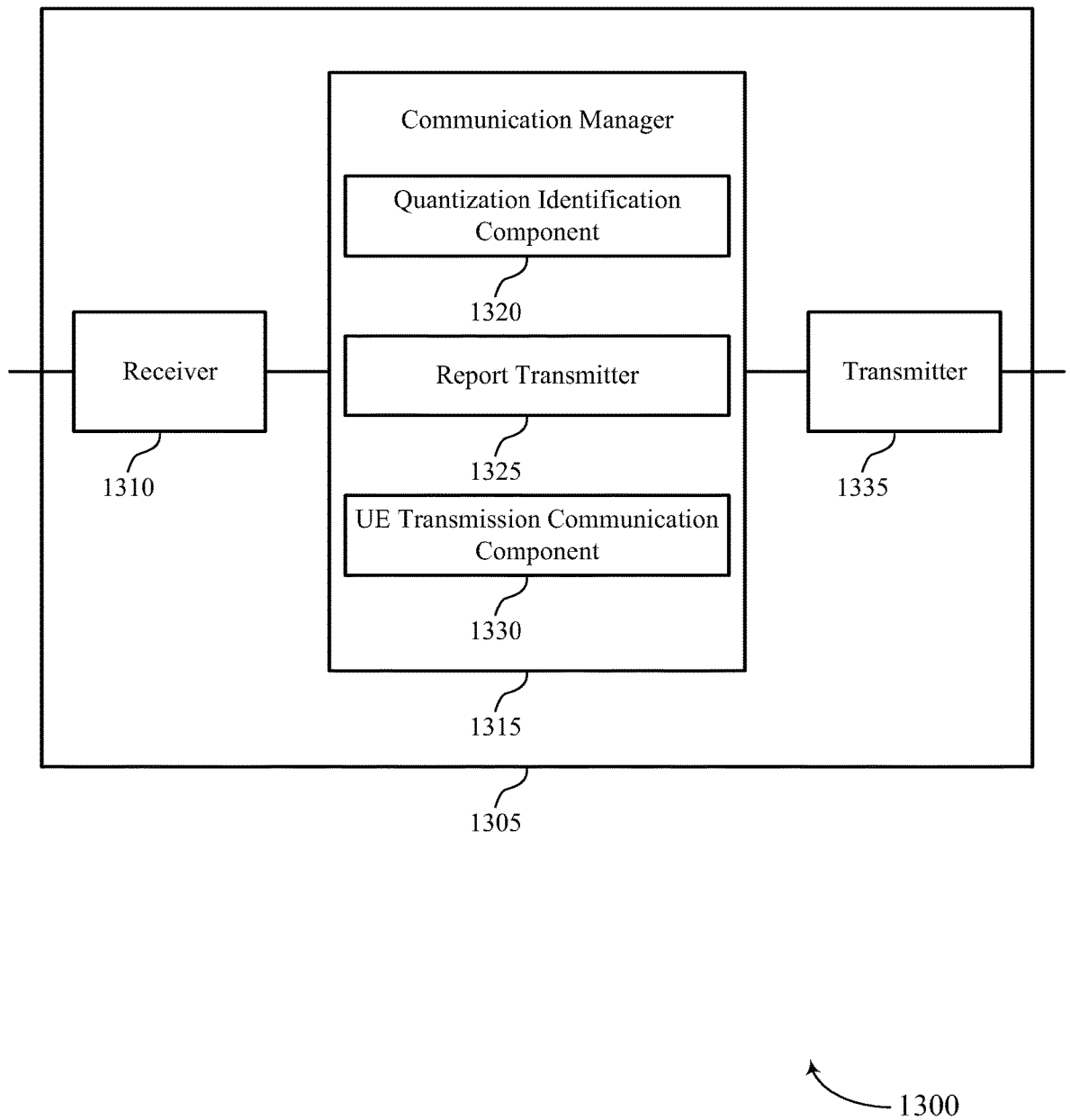

FIG. 13 shows a diagram 1300 of a device 1305 that supports UE timeline quantization in accordance with aspects of the present disclosure. The device 1305 may be an example of aspects of a device 1205, or a UE 115 as described herein. The device 1305 may include a receiver 1310, a communication manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to UE timeline quantization, etc.). Information may be passed on to other components of the device 1305. The receiver 1310 may be an example of aspects of the transceiver 1515 described with reference to FIG. 15. The receiver 1310 may utilize a single antenna or a set of antennas.

The communication manager 1315 may be an example of aspects of the communication manager 1215 as described herein. The communication manager 1315 may include a quantization identification component 1320, a report transmitter 1325, and an UE transmission communication component 1330. The communication manager 1315 may be an example of aspects of the communication manager 1510 described herein.

The quantization identification component 1320 may identify that the UE is to utilize the slot level quantization.

The report transmitter 1325 may transmit a report indicating a capability of the UE to support symbol level quantization, slot level quantization, or both.

The UE transmission communication component 1330 may receive a first transmission via a first channel and communicate, responsive to receiving the first transmission, a second transmission via a second channel at a quantized start timing determined in accordance with the slot level quantization.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1515 described with reference to FIG. 15. The transmitter 1335 may utilize a single antenna or a set of antennas.

Figure 14:
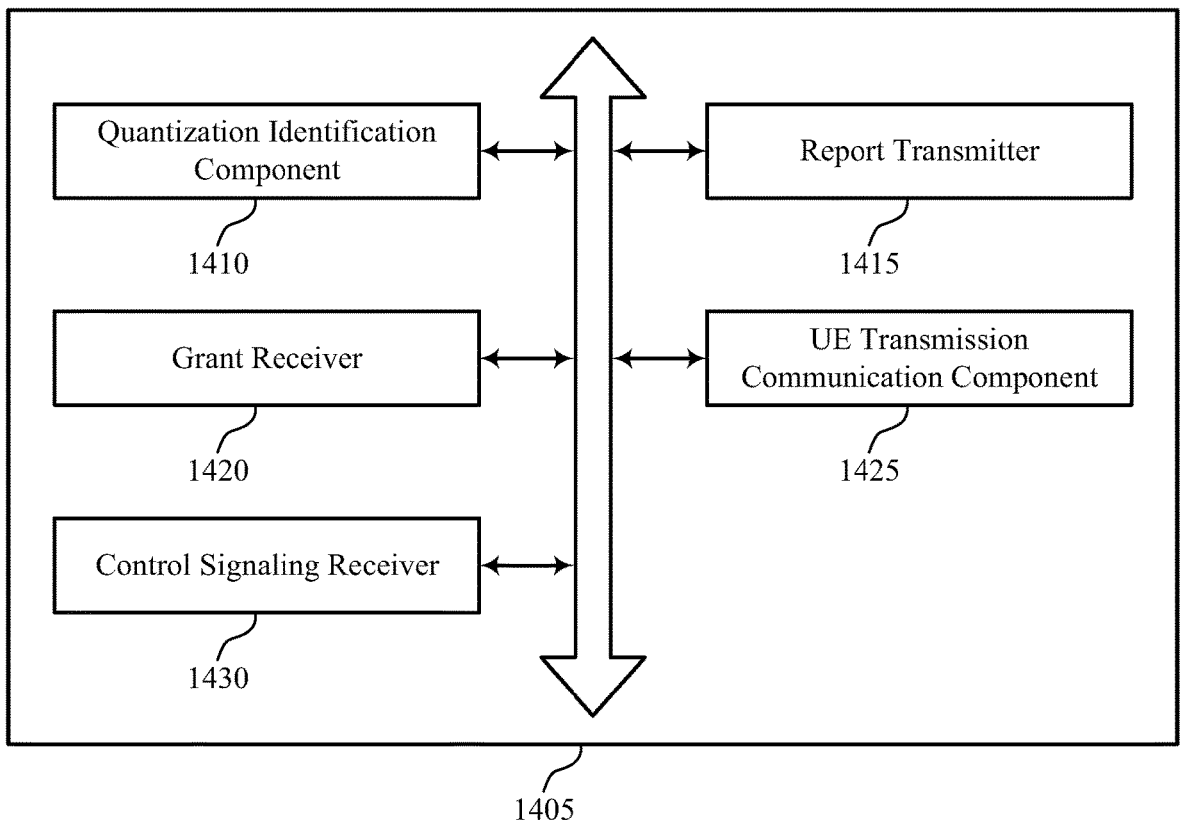
FIG. 14 shows a diagram of a communication manager that supports UE timeline quantization in accordance with aspects of the present disclosure.

FIG. 14 shows a diagram 1400 of a communication manager 1405 that supports UE timeline quantization in accordance with aspects of the present disclosure. The communication manager 1405 may be an example of aspects of a communication manager 1215, a communication manager 1315, or a communication manager 1510 described herein. The communication manager 1405 may include a quantization identification component 1410, a report transmitter 1415, a grant receiver 1420, an UE transmission communication component 1425, and a control signaling receiver 1430. Each of these modules may communicate, directly or indirectly, with one another (e.g., via one or more buses).

The quantization identification component 1410 may identify that the UE is to utilize the slot level quantization. In some examples, the quantization identification component 1410 may identify that the UE is to utilize slot level quantization based on a determination that control signaling indicating which of symbol level quantization or slot level quantization to use has not been received in response to transmission of the report.

The report transmitter 1415 may transmit a report indicating a capability of the UE to support symbol level quantization, slot level quantization, or both. In some examples, the report transmitter 1415 may transmit the report providing a first capability indication of the UE to support symbol level quantization, slot level quantization, or both, for a first bandwidth part. In some examples, the report transmitter 1415 may transmit the report providing a second capability indication of the UE to support symbol level quantization, slot level quantization, or both, for a second bandwidth part that is different than the first bandwidth part. In some examples, the report transmitter 1415 may transmit the report providing a capability indication of the UE to support symbol level quantization, slot level quantization, or both, for each bandwidth part of a set of bandwidth parts. In some examples, the report transmitter 1415 may transmit the report providing a first capability indication of the UE to support slot level quantization, symbol level quantization, or both, on a first bandwidth part and a second capability indication of the UE to support symbol level quantization, slot level quantization, or both, on a second bandwidth part.

The grant receiver 1420 may receive a grant allocating a resource of the first channel for the first transmission, where the second transmission is a feedback message for the first transmission that is communicated via the second channel at the quantized start timing determined in accordance with the slot level quantization.

The UE transmission communication component 1425 may receive a first transmission via a first channel. In some examples, the UE transmission communication component 1425 may communicate, responsive to receiving the first transmission, a second transmission via a second channel at a quantized start timing determined in accordance with the slot level quantization. In some examples, the UE transmission communication component 1425 may receive the first transmission that is a grant allocating a resource of the second channel for the second transmission. In some examples, the UE transmission communication component 1425 may receive a third transmission on the first channel. In some examples, the UE transmission communication component 1425 may communicate, responsive to receiving the third transmission, a fourth transmission via the second channel at a second quantized starting time determined in accordance with the symbol level quantization.

The control signaling receiver 1430 may receive control signaling indicating that the UE is to utilize slot level quantization by converting a symbol level offset to a number of slots using a ceiling function and applying a slot level offset relative to an ending symbol period of the first transmission based on the number of slots to identify the quantized start timing for the second transmission, where the second transmission is communicated in accordance with the quantized start timing. In some examples, the control signaling receiver 1430 may receive control signaling indicating that the UE is to utilize slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission, where the second transmission is communicated in accordance with the quantized start timing. In some examples, the control signaling receiver 1430 may receive control signaling indicating that the UE is to utilize slot level quantization on a first bandwidth part and slot level quantization or symbol level quantization on a second bandwidth part.

In some examples, the control signaling receiver 1430 may receive control signaling that is radio resource control signaling, downlink control information, a medium access control (MAC) control element, or any combination thereof, indicating that the UE is to utilize the slot level quantization. In some examples, the control signaling receiver 1430 may receive control signaling indicating that the UE is to utilize symbol level quantization. In some examples, the control signaling receiver 1430 may receive control signaling indicating that the UE is to apply symbol level quantization on a first carrier and slot level quantization on a second carrier that differs from the first carrier, where the first carrier is a scheduling carrier for the second carrier. In some examples, the control signaling receiver 1430 may receive control signaling indicating that the UE is to apply symbol level quantization on a first carrier having a first subcarrier spacing and slot level quantization on a second carrier having a second subcarrier spacing that is higher than the first subcarrier spacing. In some examples, the control signaling receiver 1430 may receive control signaling that is radio resource control signaling, downlink control information, a medium access control (MAC) control element, or any combination thereof, indicating which of slot level quantization or symbol level quantization the UE is to utilize.

Figure 15:
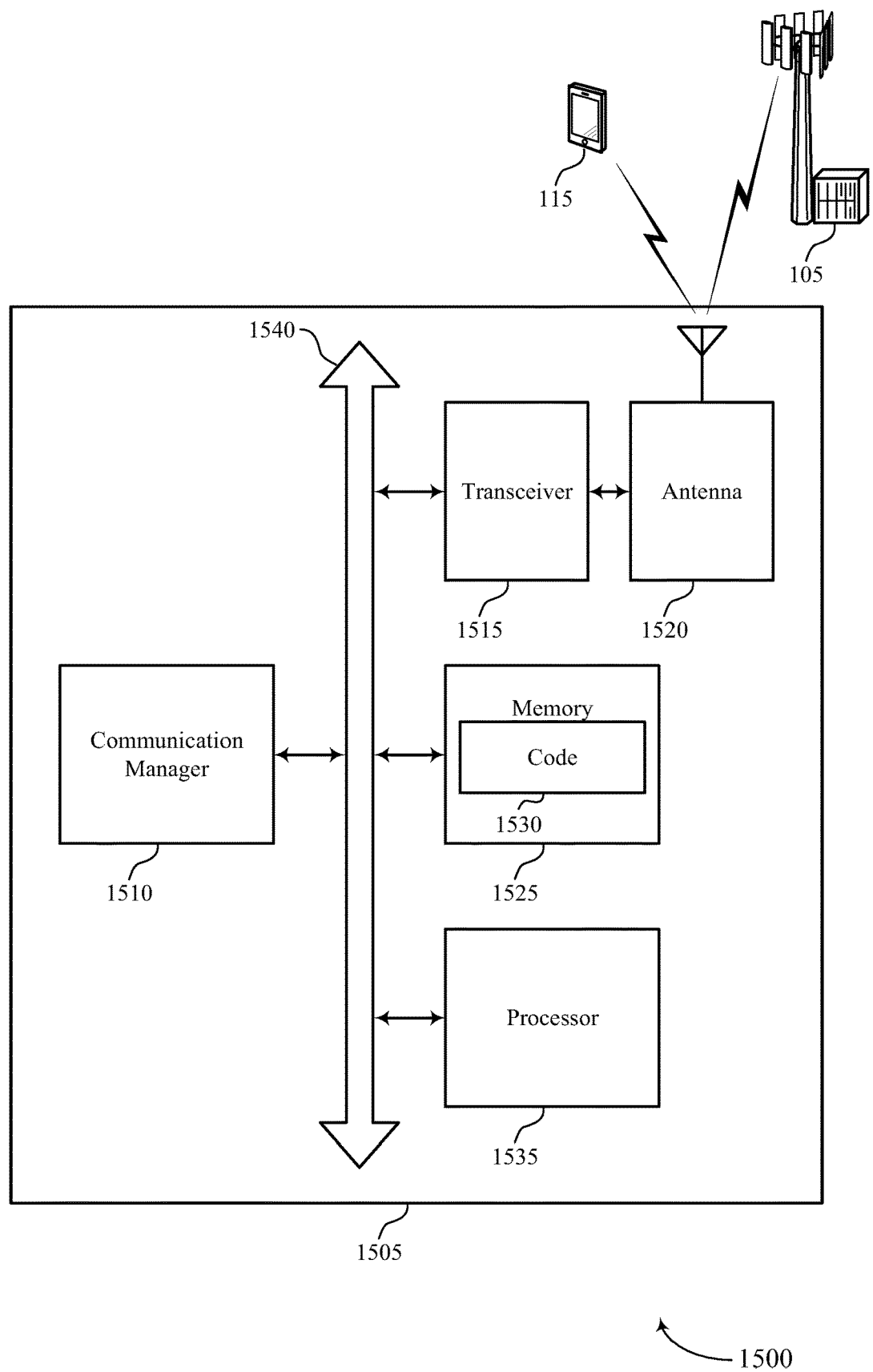
FIG. 15 shows a diagram of a system including a device that supports UE timeline quantization in accordance with aspects of the present disclosure.

FIG. 15 shows a diagram of a system 1500 including a device 1505 that supports UE timeline quantization in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communication manager 1510, a transceiver 1515, an antenna 1520, memory 1525, and a processor 1535. These components may be in electronic communication via one or more buses (e.g., bus 1540).

The communication manager 1510 may identify that the UE is to utilize the slot level quantization, transmit a report indicating a capability of the UE to support symbol level quantization, slot level quantization, or both, receive a first transmission via a first channel, and communicate, responsive to receiving the first transmission, a second transmission via a second channel at a quantized start timing determined in accordance with the slot level quantization.

The transceiver 1515 may communicate bi-directionally, via one or more antennas, wired, or wireless links as described above. For example, the transceiver 1515 may represent a wireless transceiver and may communicate bi-directionally with another wireless transceiver. The transceiver 1515 may also include a modem to modulate the packets and provide the modulated packets to the antennas for transmission, and to demodulate packets received from the antennas.

In some cases, the wireless device may include a single antenna 1520. However, in some cases the device may have more than one antenna 1520, which may be capable of concurrently transmitting or receiving multiple wireless transmissions.

The memory 1525 may include RAM and ROM. The memory 1525 may store computer-readable, computer-executable code 1530 including instructions that, when executed, cause the processor to perform various functions described herein. In some cases, the memory 1525 may contain, among other things, a BIOS which may control basic hardware or software operation such as the interaction with peripheral components or devices.

The code 1530 may include instructions to implement aspects of the present disclosure, including instructions to support wireless communications. The code 1530 may be stored in a non-transitory computer-readable medium such as system memory or other type of memory. In some cases, the code 1530 may not be directly executable by the processor 1535 but may cause a computer (e.g., when compiled and executed) to perform functions described herein.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting UE timeline quantization).

Figure 16:
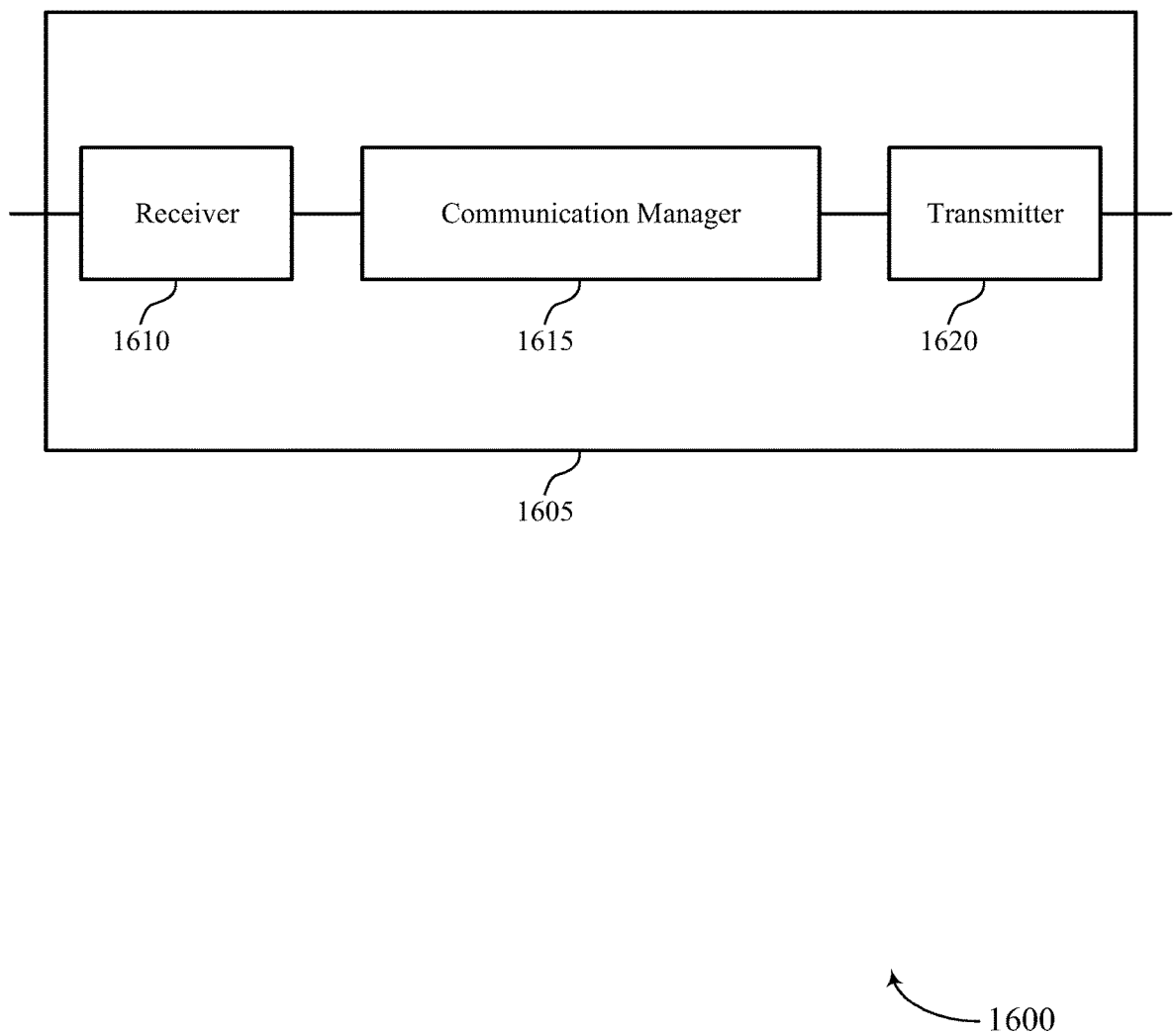
FIGS. 16 and 17 show diagrams of devices that support UE timeline quantization in accordance with aspects of the present disclosure.

FIG. 16 shows a diagram 1600 of a device 1605 that supports UE timeline quantization in accordance with aspects of the present disclosure. The device 1605 may be an example of aspects of a base station 105 as described herein. The device 1605 may include a receiver 1610, a communication manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to UE timeline quantization, etc.). Information may be passed on to other components of the device 1605. The receiver 1610 may be an example of aspects of the transceiver 1920 described with reference to FIG. 19. The receiver 1610 may utilize a single antenna or a set of antennas.

The communication manager 1615 may receive a report indicating a capability of a UE to support symbol level quantization, slot level quantization, or both, determine that the UE is to utilize slot level quantization, transmit a first transmission via a first channel, and communicate, responsive to receiving the first transmission, a second transmission via a second channel at a quantized start timing determined in accordance with the slot level quantization. The communication manager 1615 may be an example of aspects of the communication manager 1910 described herein.

The communication manager 1615, or its sub-components, may be implemented in hardware, code (e.g., software or firmware) executed by a processor, or any combination thereof. If implemented in code executed by a processor, the functions of the communication manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 1615, or its sub-components, may be physically located at various positions, including being distributed such that portions of functions are implemented at different physical locations by one or more physical components. In some examples, the communication manager 1615, or its sub-components, may be a separate and distinct component in accordance with various aspects of the present disclosure. In some examples, the communication manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
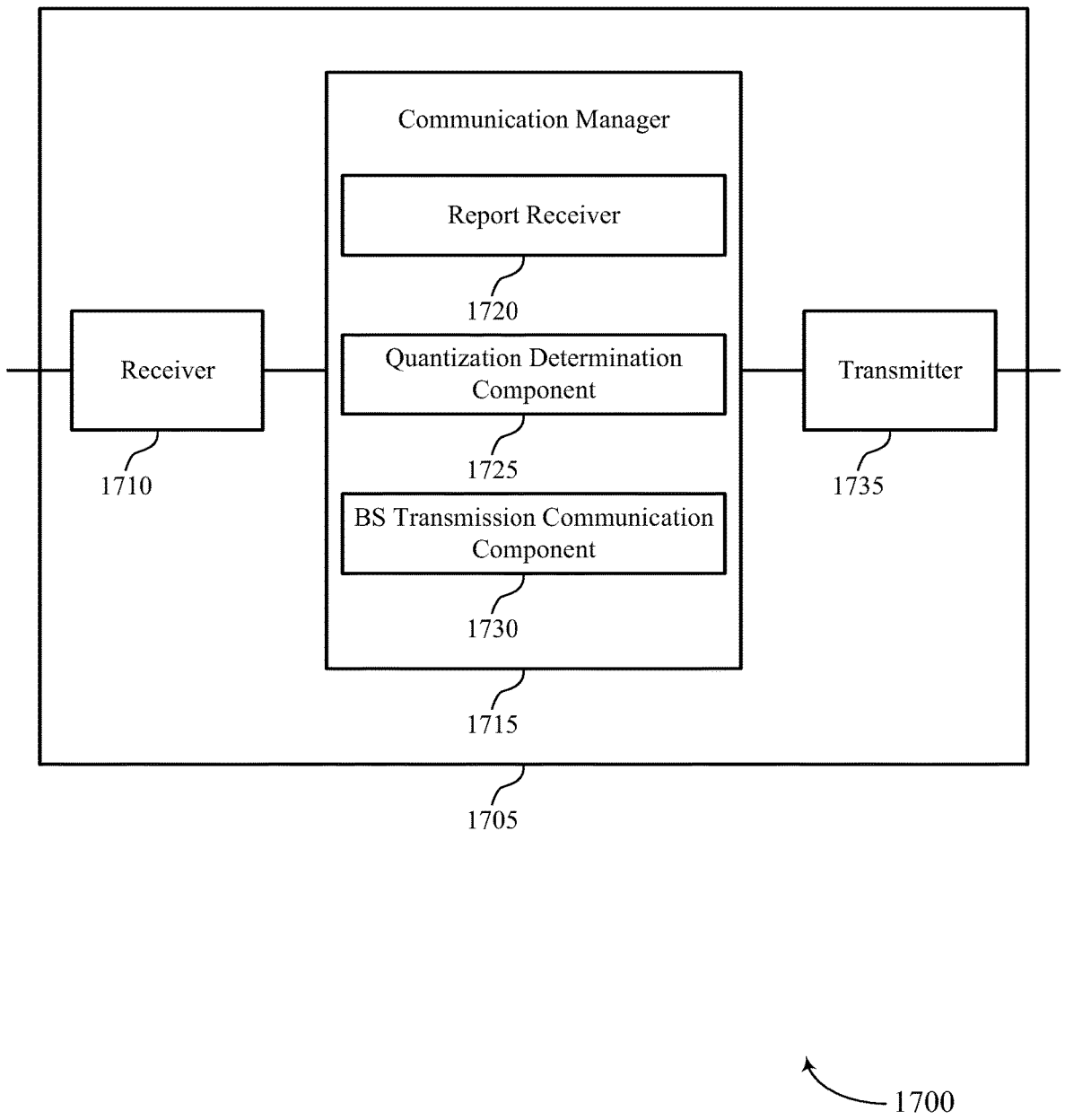

FIG. 17 shows a diagram 1700 of a device 1705 that supports UE timeline quantization in accordance with aspects of the present disclosure. The device 1705 may be an example of aspects of a device 1605, or a base station 105 as described herein. The device 1705 may include a receiver 1710, a communication manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to UE timeline quantization, etc.). Information may be passed on to other components of the device 1705. The receiver 1710 may be an example of aspects of the transceiver 1920 described with reference to FIG. 19. The receiver 1710 may utilize a single antenna or a set of antennas.

The communication manager 1715 may be an example of aspects of the communication manager 1615 as described herein. The communication manager 1715 may include a report receiver 1720, a quantization determination component 1725, and a BS transmission communication component 1730. The communication manager 1715 may be an example of aspects of the communication manager 1910 described herein.

The report receiver 1720 may receive a report indicating a capability of a UE to support symbol level quantization, slot level quantization, or both.

The quantization determination component 1725 may determine that the UE is to utilize slot level quantization.

The BS transmission communication component 1730 may transmit a first transmission via a first channel and communicate, responsive to transmitting the first transmission, a second transmission via a second channel at a quantized start timing determined in accordance with the slot level quantization.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
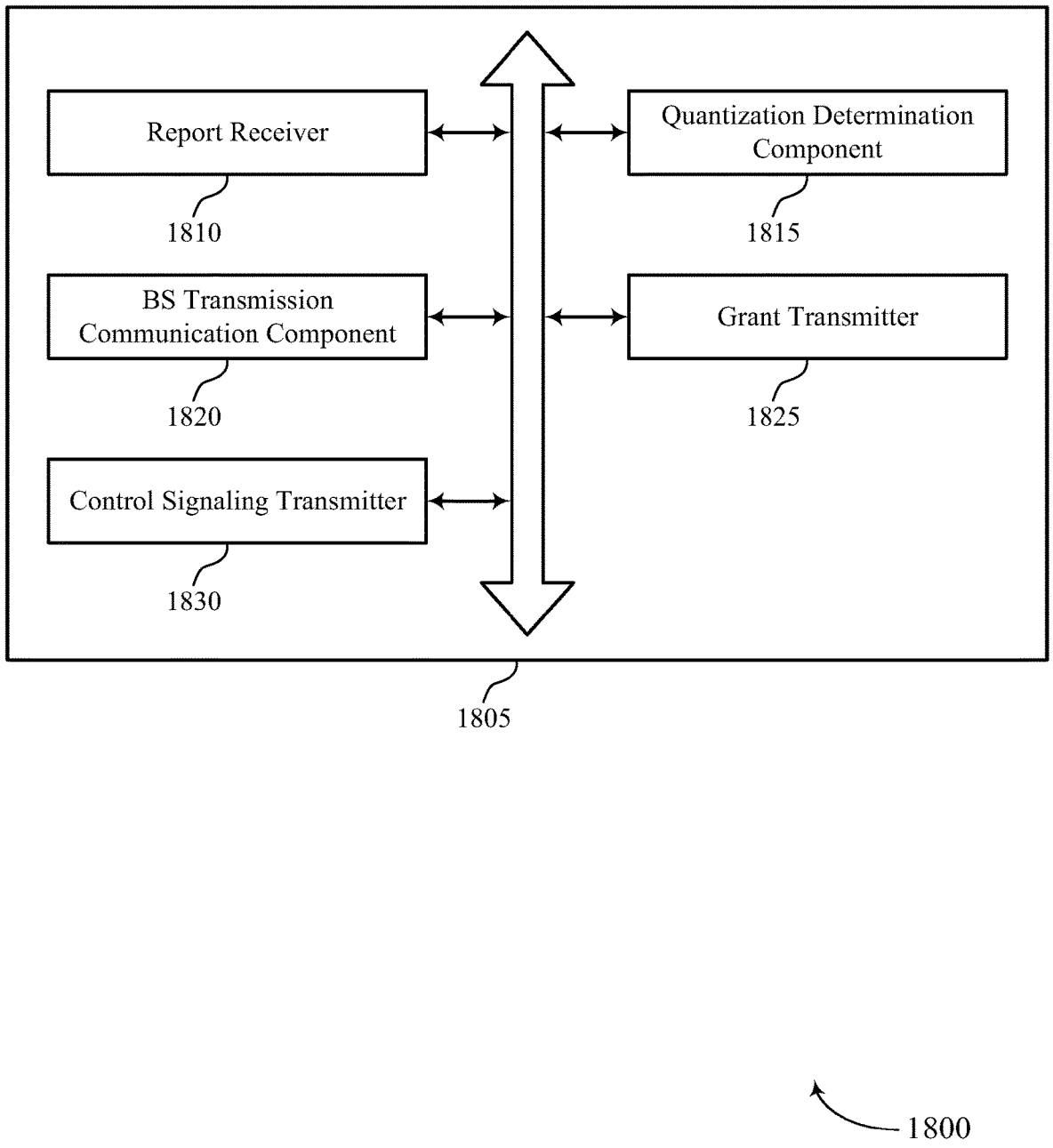
FIG. 18 shows a diagram of a communication manager that supports UE timeline quantization in accordance with aspects of the present disclosure.

FIG. 18 shows a diagram 1800 of a communication manager 1805 that supports UE timeline quantization in accordance with aspects of the present disclosure. The communication manager 1805 may be an example of aspects of a communication manager 1615, a communication manager 1715, or a communication manager 1910 described herein. The communication manager 1805 may include a report receiver 1810, a quantization determination component 1815, a BS transmission communication component 1820, a grant transmitter 1825, and a control signaling transmitter 1830. Each of these modules may communicate, directly or indirectly, with one another (e.g., via one or more buses).

The report receiver 1810 may receive a report indicating a capability of a UE to support symbol level quantization, slot level quantization, or both. In some examples, the report receiver 1810 may receive the report providing a first capability indication of the UE to support symbol level quantization, slot level quantization, or both, for a first bandwidth part. In some examples, the report receiver 1810 may receive the report providing a second capability indication of the UE to support symbol level quantization, slot level quantization, or both, for a second bandwidth part that is different than the first bandwidth part. In some examples, the report receiver 1810 may receive the report providing a capability indication of the UE to support symbol level quantization, slot level quantization, or both, for each bandwidth part of a set of bandwidth parts. In some examples, the report receiver 1810 may receive the report providing a first capability indication of the UE to support slot level quantization, symbol level quantization, or both on a first bandwidth part and a second capability indication of the UE to support slot level quantization, symbol level quantization, or both for a second bandwidth part.

The quantization determination component 1815 may determine that the UE is to utilize slot level quantization.

The BS transmission communication component 1820 may transmit a first transmission via a first channel. In some examples, the BS transmission communication component 1820 may communicate, responsive to transmitting the first transmission, a second transmission via a second channel at a quantized start timing determined in accordance with the slot level quantization. In some examples, the BS transmission communication component 1820 may transmit the first transmission that is a grant allocating a resource of the second channel for the second transmission. In some examples, the BS transmission communication component 1820 may transmit a third transmission of the first channel. In some examples, the BS transmission communication component 1820 may communicate, responsive to transmitting the third transmission, a fourth transmission via the second channel at a second quantized starting time determined in accordance with the symbol level quantization.

The grant transmitter 1825 may transmit a grant allocating a resource of the first channel for the first transmission, where the second transmission is a feedback message for the first transmission that is communicated via the second channel at the quantized start timing determined in accordance with the slot level quantization.

The control signaling transmitter 1830 may transmit control signaling indicating that the UE is to utilize slot level quantization by converting a symbol level offset to a number of slots using a ceiling function and applying a slot level offset relative to an ending symbol period of the first transmission based on the number of slots to identify the quantized start timing for the second transmission, where the second transmission is communicated in accordance with the quantized start timing. In some examples, the control signaling transmitter 1830 may transmit control signaling indicating that the UE is to utilize slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission, where the second transmission is communicated in accordance with the quantized start timing. In some examples, the control signaling transmitter 1830 may transmit control signaling indicating that the UE is to utilize slot level quantization on a first bandwidth part and slot level quantization or symbol level quantization on a second bandwidth part. In some examples, the control signaling transmitter 1830 may transmit control signaling that is radio resource control signaling, downlink control information, a medium access control (MAC) control element, or any combination thereof, indicating that the UE is to utilize the slot level quantization.

In some examples, the control signaling transmitter 1830 may transmit control signaling indicating that the UE is to utilize symbol level quantization. In some examples, the control signaling transmitter 1830 may transmit control signaling indicating that the UE is to apply symbol level quantization on a first carrier and slot level quantization on a second carrier that differs from the first carrier, where the first carrier is a scheduling carrier for the second carrier. In some examples, the control signaling transmitter 1830 may transmit control signaling indicating that the UE is to apply symbol level quantization on a first carrier having a first subcarrier spacing and slot level quantization on a second carrier having a second subcarrier spacing that is higher than the first subcarrier spacing. In some examples, the control signaling transmitter 1830 may transmit control signaling that is radio resource control signaling, downlink control information, a medium access control (MAC) control element, or any combination thereof, indicating which of slot level quantization or symbol level quantization the UE is to utilize.

Figure 19:
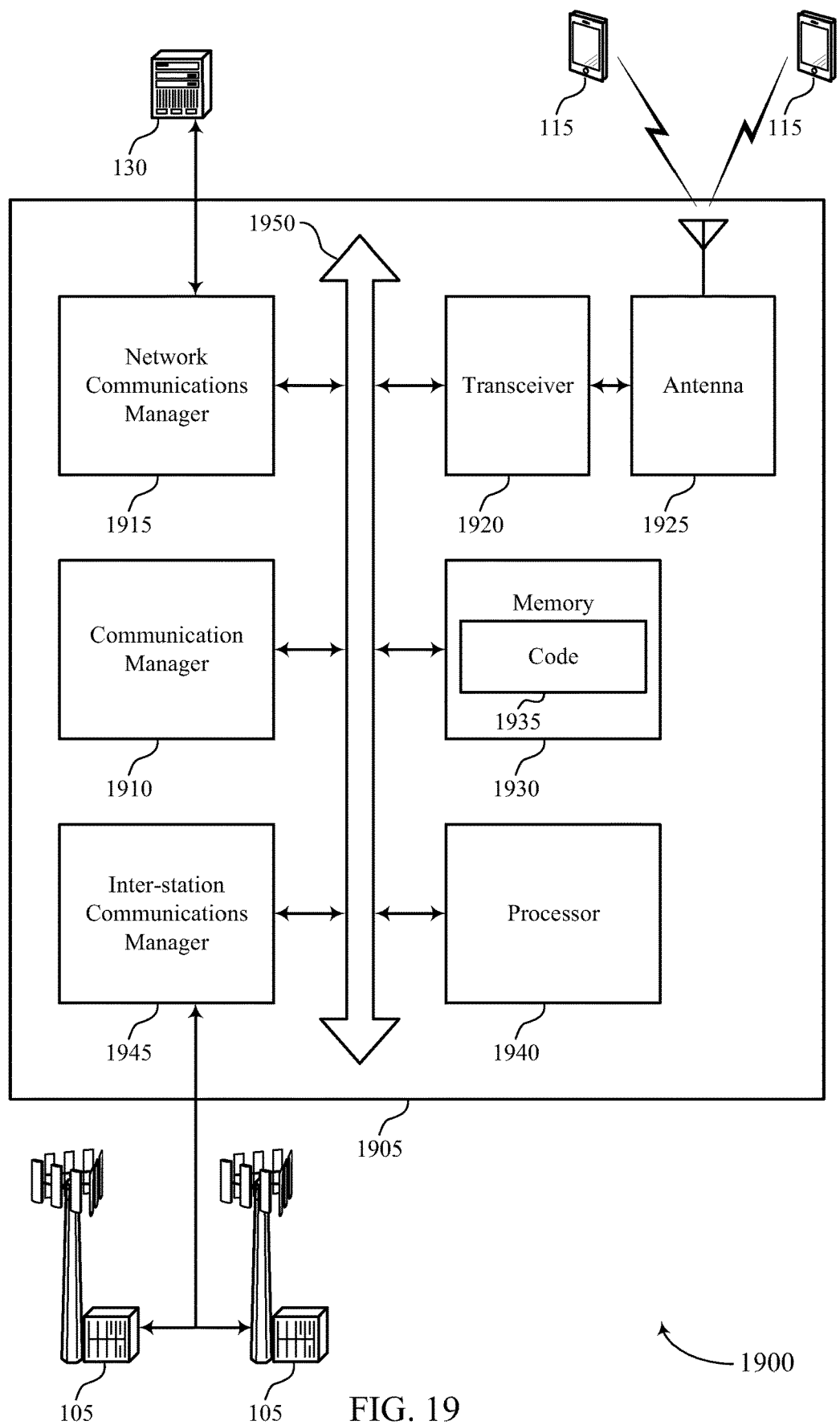
FIG. 19 shows a diagram of a system including a device that supports UE timeline quantization in accordance with aspects of the present disclosure.

FIG. 19 shows a diagram of a system 1900 including a device 1905 that supports UE timeline quantization in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communication manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communication manager 1910 may receive a report indicating a capability of a UE to support symbol level quantization, slot level quantization, or both, determine that the UE is to utilize slot level quantization, transmit a first transmission via a first channel, and communicate, responsive to transmitting the first transmission, a second transmission via a second channel at a quantized start timing determined in accordance with the slot level quantization.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1935 including instructions that, when executed, cause the processor to perform various functions described herein. In some cases, the memory 1930 may contain, among other things, a BIOS which may control basic hardware or software operation such as the interaction with peripheral components or devices.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting UE timeline quantization).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

Figure 20:
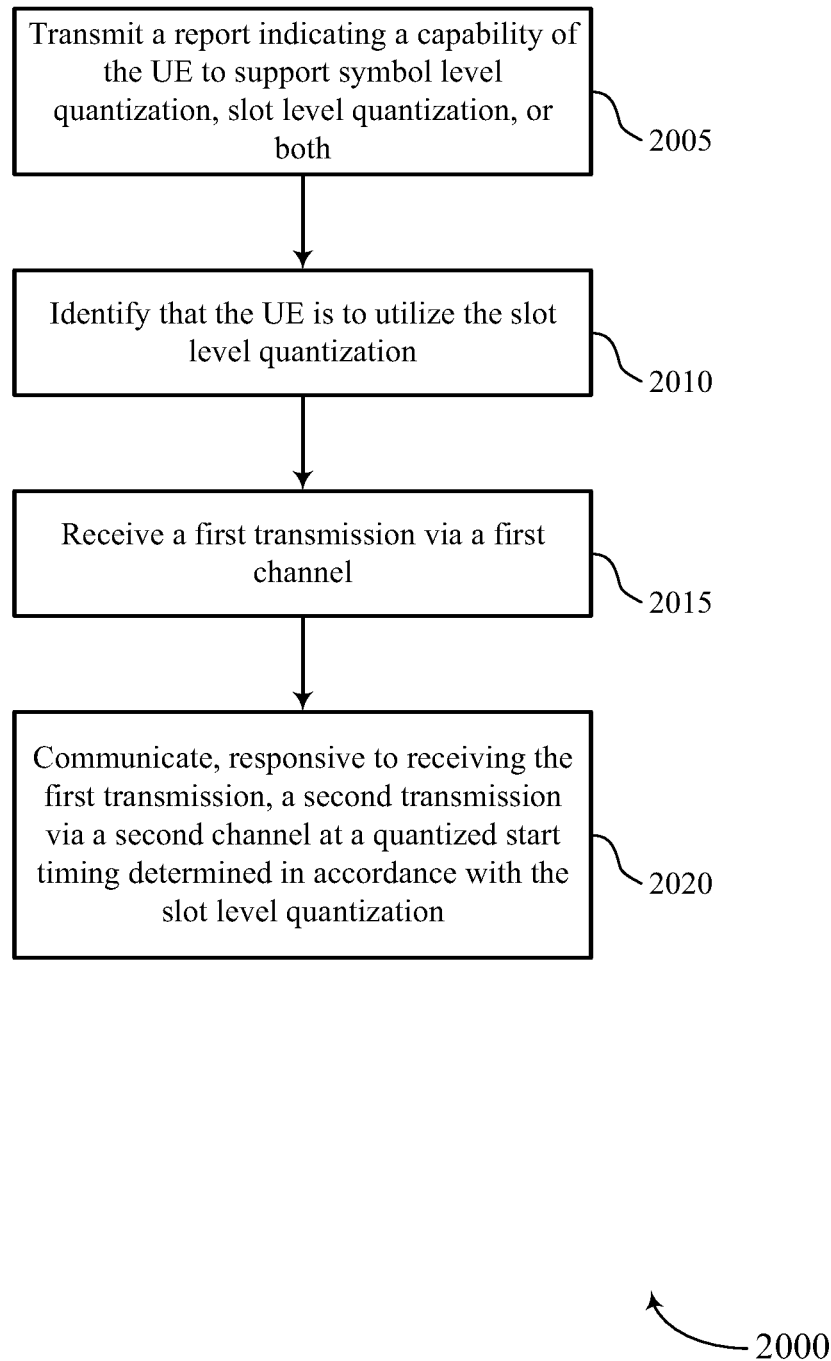
FIGS. 20 through 25 show flowcharts illustrating methods that support UE timeline quantization in accordance with aspects of the present disclosure.

FIG. 20 shows a flowchart illustrating a method 2000 that supports UE timeline quantization in accordance with aspects of the present disclosure. The operations of method 2000 may be implemented by a UE 115 or its components as described herein. For example, the operations of method 2000 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2005, the UE may transmit a report indicating a capability of the UE to support symbol level quantization, slot level quantization, or both. The operations of 2005 may be performed according to the methods described herein. In some examples, aspects of the operations of 2005 may be performed by a report transmitter as described with reference to FIGS. 12 through 15.

At 2010, the UE may identify that the UE is to utilize the slot level quantization. The operations of 2010 may be performed according to the methods described herein. In some examples, aspects of the operations of 2010 may be performed by a quantization identification component as described with reference to FIGS. 12 through 15.

At 2015, the UE may receive a first transmission via a first channel. The operations of 2015 may be performed according to the methods described herein. In some examples, aspects of the operations of 2015 may be performed by an UE transmission communication component as described with reference to FIGS. 12 through 15.

At 2020, the UE may communicate, responsive to receiving the first transmission, a second transmission via a second channel at a quantized start timing determined in accordance with the slot level quantization. The operations of 2020 may be performed according to the methods described herein. In some examples, aspects of the operations of 2020 may be performed by an UE transmission communication component as described with reference to FIGS. 12 through 15.

Figure 21:
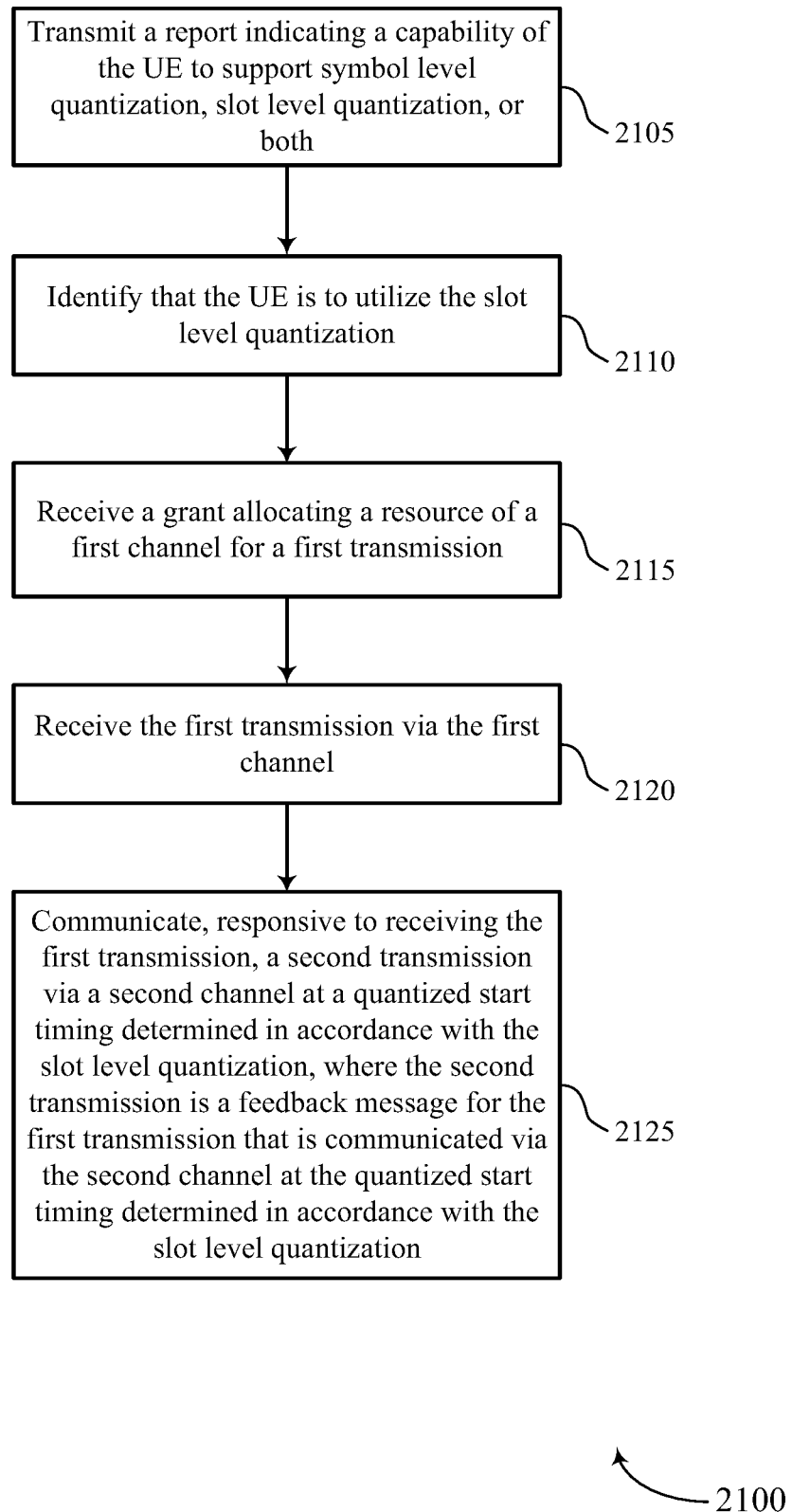

FIG. 21 shows a flowchart illustrating a method 2100 that supports UE timeline quantization in accordance with aspects of the present disclosure. The operations of method 2100 may be implemented by a UE 115 or its components as described herein. For example, the operations of method 2100 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2105, the UE may transmit a report indicating a capability of the UE to support symbol level quantization, slot level quantization, or both. The operations of 2105 may be performed according to the methods described herein. In some examples, aspects of the operations of 2105 may be performed by a report transmitter as described with reference to FIGS. 12 through 15.

At 2110, the UE may identify that the UE is to utilize the slot level quantization. The operations of 2110 may be performed according to the methods described herein. In some examples, aspects of the operations of 2110 may be performed by a quantization identification component as described with reference to FIGS. 12 through 15.

At 2115, the UE may receive a grant allocating a resource of a first channel for a first transmission. The operations of 2115 may be performed according to the methods described herein. In some examples, aspects of the operations of 2115 may be performed by a grant receiver as described with reference to FIGS. 12 through 15.

At 2120, the UE may receive the first transmission via the first channel. The operations of 2120 may be performed according to the methods described herein. In some examples, aspects of the operations of 2120 may be performed by an UE transmission communication component as described with reference to FIGS. 12 through 15.

At 2125, the UE may communicate, responsive to receiving the first transmission, a second transmission via a second channel at a quantized start timing determined in accordance with the slot level quantization, where the second transmission is a feedback message for the first transmission that is communicated via the second channel at the quantized start timing determined in accordance with the slot level quantization. The operations of 2125 may be performed according to the methods described herein. In some examples, aspects of the operations of 2125 may be performed by an UE transmission communication component as described with reference to FIGS. 12 through 15.

Figure 22:
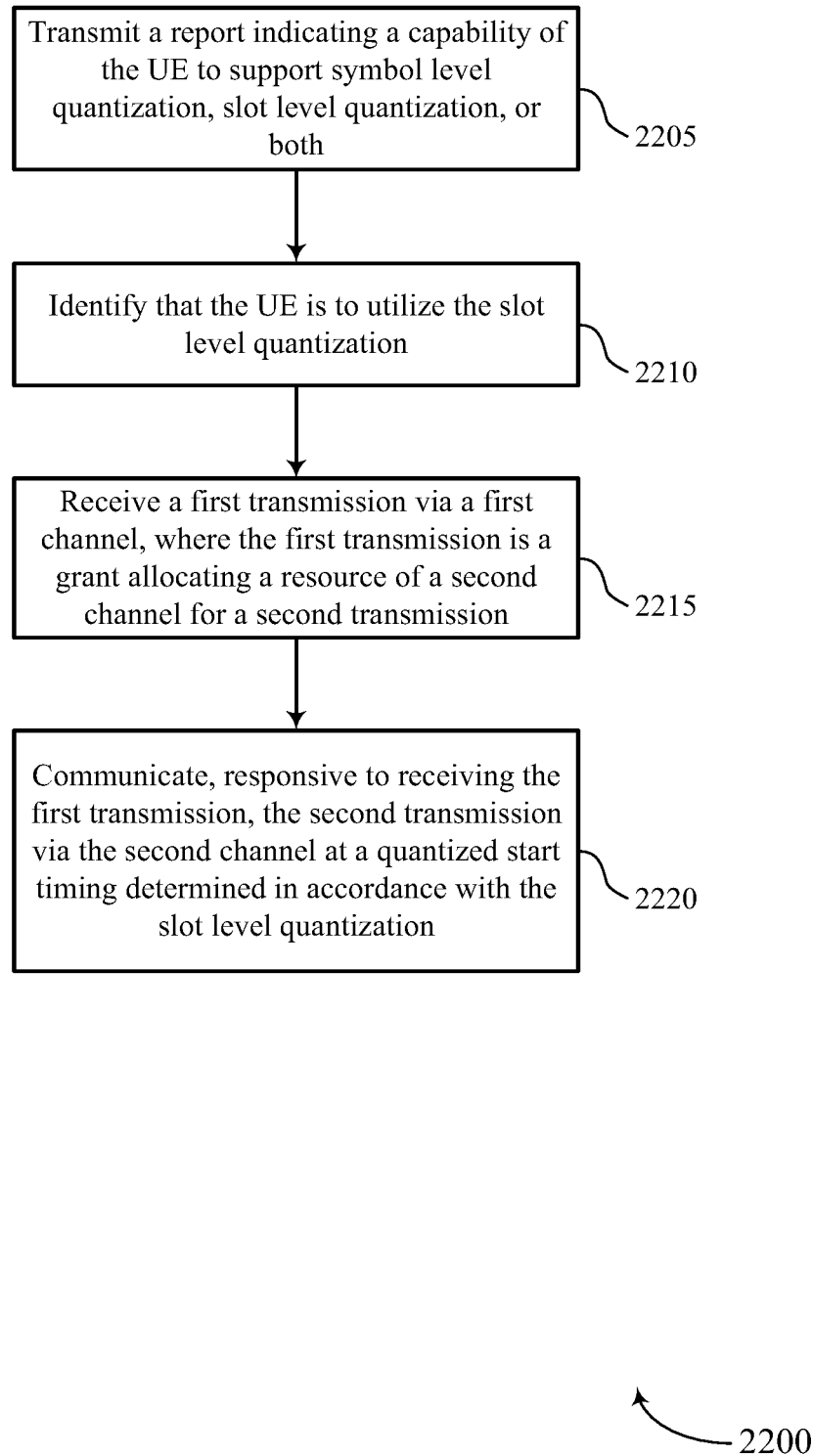

FIG. 22 shows a flowchart illustrating a method 2200 that supports UE timeline quantization in accordance with aspects of the present disclosure. The operations of method 2200 may be implemented by a UE 115 or its components as described herein. For example, the operations of method 2200 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2205, the UE may transmit a report indicating a capability of the UE to support symbol level quantization, slot level quantization, or both. The operations of 2205 may be performed according to the methods described herein. In some examples, aspects of the operations of 2205 may be performed by a report transmitter as described with reference to FIGS. 12 through 15.

At 2210, the UE may identify that the UE is to utilize the slot level quantization. The operations of 2210 may be performed according to the methods described herein. In some examples, aspects of the operations of 2210 may be performed by a quantization identification component as described with reference to FIGS. 12 through 15.

At 2215, the UE may receive a first transmission via a first channel, where the first transmission is a grant allocating a resource of a second channel for a second transmission. The operations of 2215 may be performed according to the methods described herein. In some examples, aspects of the operations of 2215 may be performed by an UE transmission communication component as described with reference to FIGS. 12 through 15.

At 2220, the UE may communicate, responsive to receiving the first transmission, the second transmission via the second channel at a quantized start timing determined in accordance with the slot level quantization. The operations of 2220 may be performed according to the methods described herein. In some examples, aspects of the operations of 2220 may be performed by an UE transmission communication component as described with reference to FIGS. 12 through 15.

Figure 23:
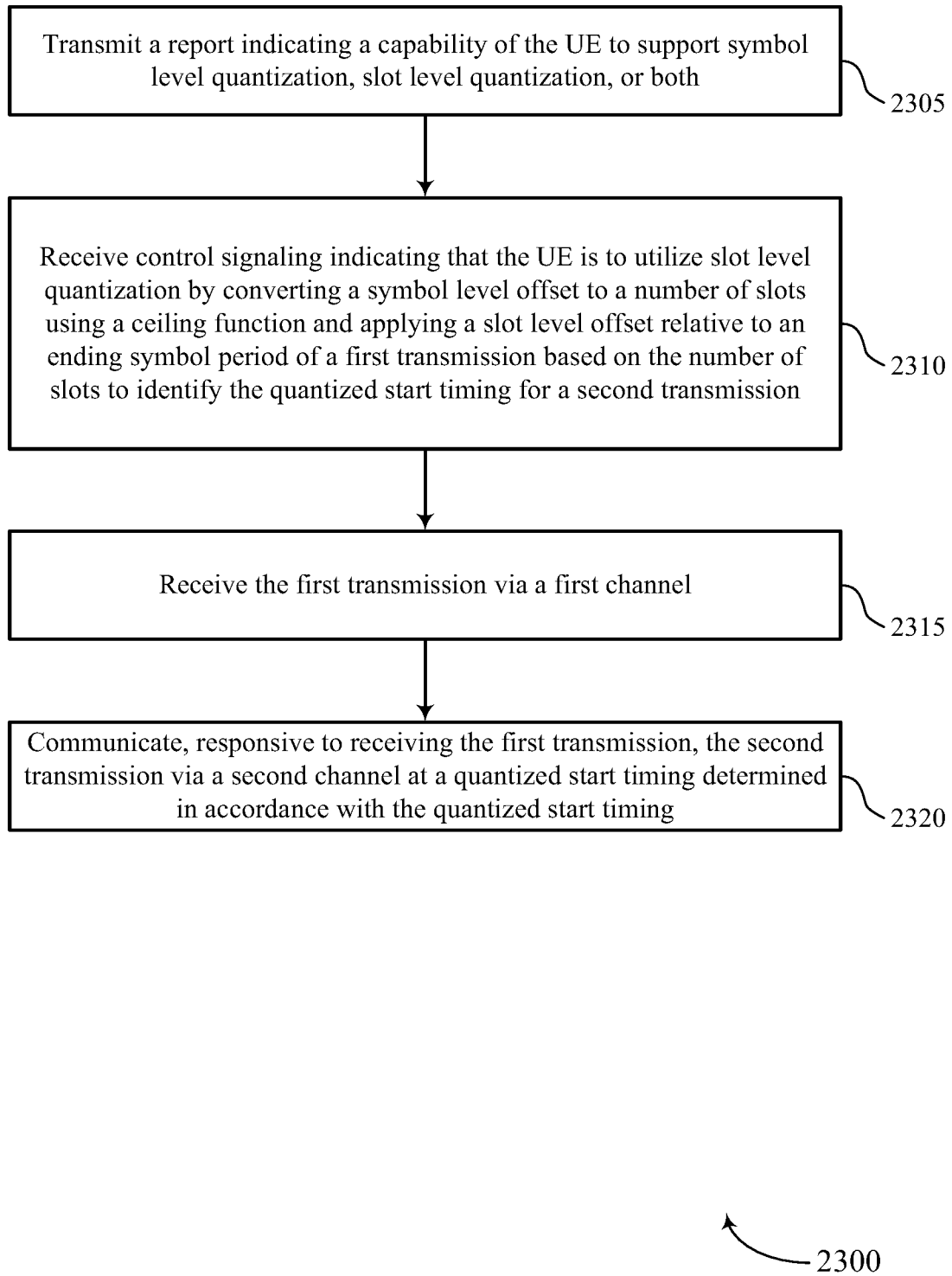

FIG. 23 shows a flowchart illustrating a method 2300 that supports UE timeline quantization in accordance with aspects of the present disclosure. The operations of method 2300 may be implemented by a UE 115 or its components as described herein. For example, the operations of method 2300 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2305, the UE may transmit a report indicating a capability of the UE to support symbol level quantization, slot level quantization, or both. The operations of 2305 may be performed according to the methods described herein. In some examples, aspects of the operations of 2305 may be performed by a report transmitter as described with reference to FIGS. 12 through 15.

At 2310, the UE may receive control signaling indicating that the UE is to utilize slot level quantization by converting a symbol level offset to a number of slots using a ceiling function and applying a slot level offset relative to an ending symbol period of a first transmission based on the number of slots to identify the quantized start timing for a second transmission. The operations of 2310 may be performed according to the methods described herein. In some examples, aspects of the operations of 2310 may be performed by a control signaling receiver as described with reference to FIGS. 12 through 15.

At 2315, the UE may receive the first transmission via a first channel. The operations of 2315 may be performed according to the methods described herein. In some examples, aspects of the operations of 2315 may be performed by an UE transmission communication component as described with reference to FIGS. 12 through 15.

At 2320, the UE may communicate, responsive to receiving the first transmission, the second transmission via a second channel at a quantized start timing determined in accordance with the quantized start timing. The operations of 2320 may be performed according to the methods described herein. In some examples, aspects of the operations of 2320 may be performed by an UE transmission communication component as described with reference to FIGS. 12 through 15.

Figure 24:
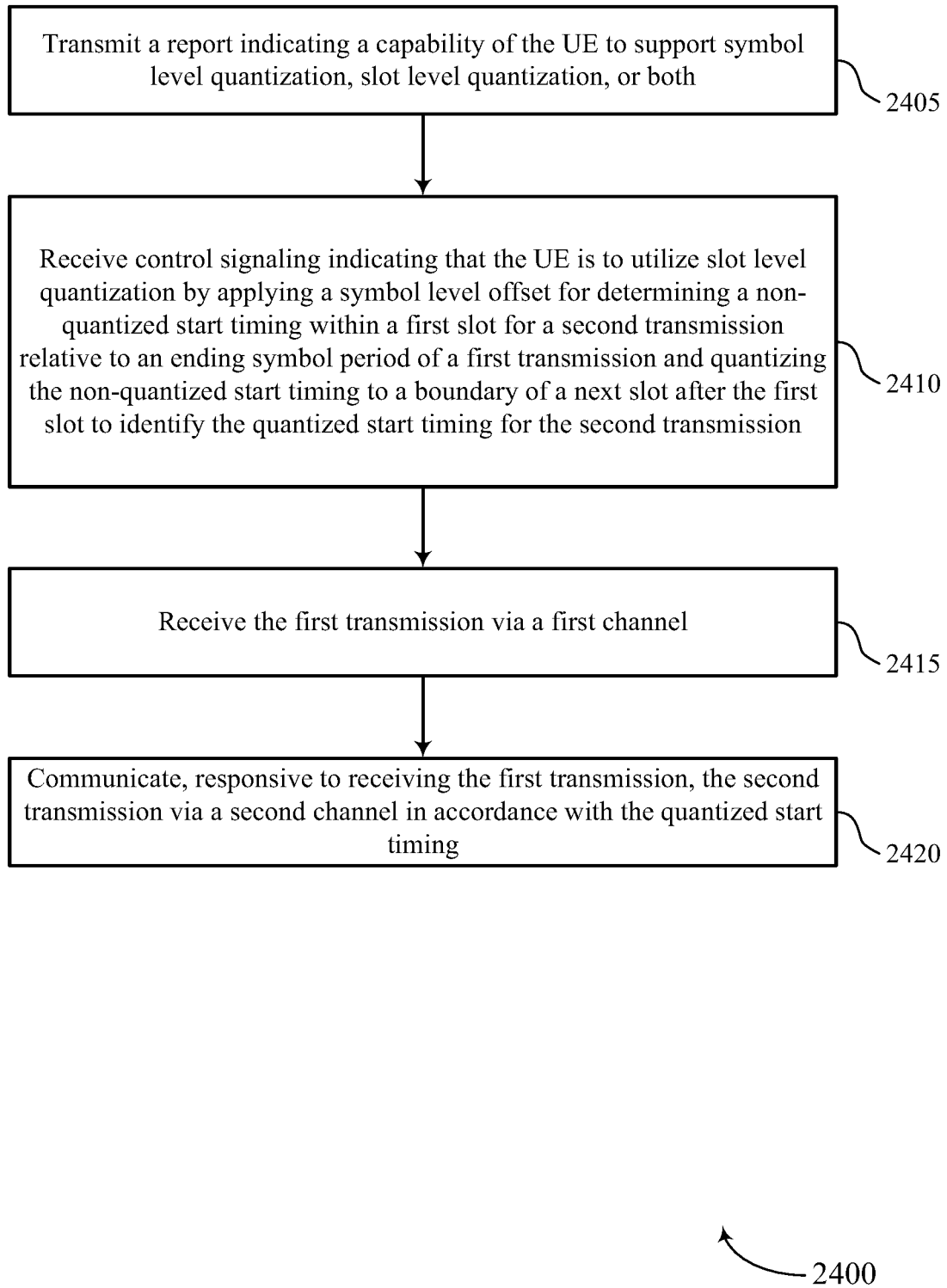

FIG. 24 shows a flowchart illustrating a method 2400 that supports UE timeline quantization in accordance with aspects of the present disclosure. The operations of method 2400 may be implemented by a UE 115 or its components as described herein. For example, the operations of method 2400 may be performed by a communication manager as described with reference to FIGS. 12 through 15. In some examples, a UE may execute a set of instructions to control the functional elements of the UE to perform the described functions. Additionally or alternatively, a UE may perform aspects of the described functions using special-purpose hardware.

At 2405, the UE may transmit a report indicating a capability of the UE to support symbol level quantization, slot level quantization, or both. The operations of 2405 may be performed according to the methods described herein. In some examples, aspects of the operations of 2405 may be performed by a report transmitter as described with reference to FIGS. 12 through 15.

At 2410, the UE may receive control signaling indicating that the UE is to utilize slot level quantization by applying a symbol level offset for determining a non-quantized start timing within a first slot for the second transmission relative to an ending symbol period of the first transmission and quantizing the non-quantized start timing to a boundary of a next slot after the first slot to identify the quantized start timing for the second transmission, where the second transmission is communicated in accordance with the quantized start timing. The operations of 2410 may be performed according to the methods described herein. In some examples, aspects of the operations of 2410 may be performed by a control signaling receiver as described with reference to FIGS. 12 through 15.

At 2415, the UE may receive the first transmission via a first channel. The operations of 2415 may be performed according to the methods described herein. In some examples, aspects of the operations of 2415 may be performed by an UE transmission communication component as described with reference to FIGS. 12 through 15.

At 2420, the UE may communicate, responsive to receiving the first transmission, the second transmission via a second channel at a quantized start timing determined in accordance with the slot level quantization. The operations of 2420 may be performed according to the methods described herein. In some examples, aspects of the operations of 2420 may be performed by an UE transmission communication component as described with reference to FIGS. 12 through 15.

Figure 25:
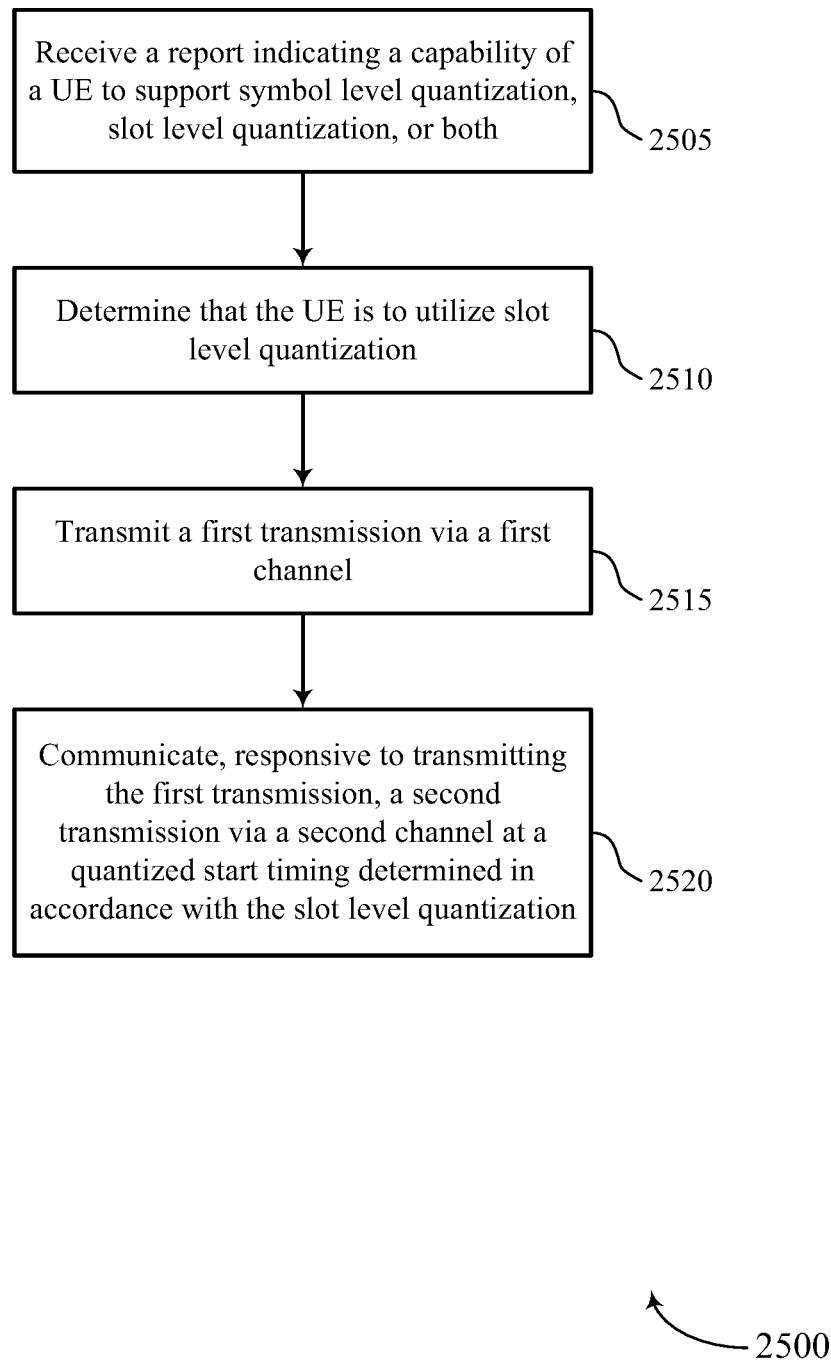

FIG. 25 shows a flowchart illustrating a method 2500 that supports UE timeline quantization in accordance with aspects of the present disclosure. The operations of method 2500 may be implemented by a base station 105 or its components as described herein. For example, the operations of method 2500 may be performed by a communication manager as described with reference to FIGS. 16 through 19. In some examples, a base station may execute a set of instructions to control the functional elements of the base station to perform the described functions. Additionally or alternatively, a base station may perform aspects of the described functions using special-purpose hardware.

At 2505, the base station may receive a report indicating a capability of a UE to support symbol level quantization, slot level quantization, or both. The operations of 2505 may be performed according to the methods described herein. In some examples, aspects of the operations of 2505 may be performed by a report receiver as described with reference to FIGS. 16 through 19.

At 2510, the base station may determine that the UE is to utilize slot level quantization. The operations of 2510 may be performed according to the methods described herein. In some examples, aspects of the operations of 2510 may be performed by a quantization determination component as described with reference to FIGS. 16 through 19.

At 2515, the base station may transmit a first transmission via a first channel. The operations of 2515 may be performed according to the methods described herein. In some examples, aspects of the operations of 2515 may be performed by a BS transmission communication component as described with reference to FIGS. 16 through 19.

At 2520, the base station may communicate, responsive to transmitting the first transmission, a second transmission via a second channel at a quantized start timing determined in accordance with the slot level quantization. The operations of 2520 may be performed according to the methods described herein. In some examples, aspects of the operations of 2520 may be performed by a BS transmission communication component as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   transmitting a report indicating a capability of the UE to support symbol level quantization, slot level quantization, or both;
   receiving control signaling indicating that the UE is to utilize the slot level quantization;
   receiving a first transmission via a first channel;
   converting a symbol level offset to a number of slots using a ceiling function;
   applying a slot level offset relative to an ending symbol period of the first transmission based at least in part on the number of slots to identify a quantized start timing for a second transmission; and
   communicating, responsive to receiving the first transmission, the second transmission via a second channel at the quantized start timing determined in accordance with the slot level quantization.

2. The method of claim 1, further comprising:
   receiving a grant allocating a resource of the first channel for the first transmission, wherein the second transmission is a feedback message for the first transmission that is communicated via the second channel at the quantized start timing determined in accordance with the slot level quantization.

3. The method of claim 1, wherein receiving the first transmission comprises:
   receiving the first transmission that is a grant allocating a resource of the second channel for the second transmission.

4. The method of claim 1, wherein identifying that the UE is to utilize the slot level quantization comprises:
   identifying that the UE is to utilize the slot level quantization based at least in part on a determination that control signaling indicating which of the symbol level quantization or the slot level quantization to use has not been received in response to transmission of the report.

5. The method of claim 1, wherein transmitting the report comprises:
   transmitting the report providing a first capability indication of the UE to support the symbol level quantization, the slot level quantization, or both, for a first bandwidth part.

6. A method for wireless communications by a user equipment (UE), comprising:
   transmitting a report indicating a capability of the UE to support symbol level quantization, slot level quantization, or both;
   receiving control signaling indicating that the UE is to utilize the slot level quantization;
   receiving a first transmission via a first channel;
   applying a symbol level offset for determining a non-quantized start timing within a first slot for a second transmission relative to an ending symbol period of the first transmission;
   quantizing the non-quantized start timing to a boundary of a next slot after the first slot to identify a quantized start timing for the second transmission
   communicating, responsive to receiving the first transmission, the second transmission via a second channel at the quantized start timing determined in accordance with the slot level quantization.

7. An apparatus for wireless communications by a user equipment (UE), comprising:
   one or more processors,
   memory in communication with the one or more processors, and
   instructions stored in the memory and executable by the one or more processors, individually or collectively, to cause the apparatus to:
      transmit a report indicating a capability of the UE to support symbol level quantization, slot level quantization, or both;
      receive control signaling indicating that the UE is to utilize the slot level quantization in which:
         a symbol level offset is converted to a number of slots based on a ceiling function, and
         a slot level offset is applied relative to an ending symbol period of a first transmission based at least in part on the number of slots to identify a quantized start timing for a second transmission;
      receive the first transmission via a first channel; and
      communicate, responsive to reception of the first transmission, the second transmission via a second channel at the quantized start timing determined in accordance with the slot level quantization.

8. The apparatus of claim 7, wherein the instructions are further executable by the one or more processors, individually or collectively, to cause the apparatus to:
   receive a grant allocating a resource of the first channel for the first transmission, wherein the second transmission is a feedback message for the first transmission that is communicated via the second channel at the quantized start timing determined in accordance with the slot level quantization.

9. The apparatus of claim 7, wherein the instructions to receive the first transmission are executable by the one or more processors, individually or collectively, to cause the apparatus to:
   receive the first transmission that is a grant allocating a resource of the second channel for the second transmission.

10. The apparatus of claim 7, wherein the instructions to identify that the UE is to utilize the slot level quantization are executable by the one or more processors, individually or collectively, to cause the apparatus to:
    identify that the UE is to utilize the slot level quantization based at least in part on a determination that control signaling indicating which of the symbol level quantization or the slot level quantization to use has not been received in response to transmission of the report.

11. The apparatus of claim 7, wherein the instructions to transmit the report are executable by the one or more processors, individually or collectively, to cause the apparatus to:

transmit the report providing a first capability indication of the UE to support the symbol level quantization, the slot level quantization, or both, for a first bandwidth part.

12. The apparatus of claim 11, wherein the instructions to transmit the report are executable by the one or more processors, individually or collectively, to cause the apparatus to:
transmit the report providing a second capability indication of the UE to support the symbol level quantization, the slot level quantization, or both, for a second bandwidth part that is different than the first bandwidth part.

13. The apparatus of claim 7, wherein the instructions to transmit the report are executable by the one or more processors, individually or collectively, to cause the apparatus to:
transmit the report providing a capability indication of the UE to support the symbol level quantization, the slot level quantization, or both, for each bandwidth part of a plurality of bandwidth parts.

14. The apparatus of claim 7, wherein the instructions to transmit the report are executable by the one or more processors, individually or collectively, to cause the apparatus to:
transmit the report providing a first capability indication of the UE to support the slot level quantization, the symbol level quantization, or both, on a first bandwidth part and a second capability indication of the UE to support the symbol level quantization, the slot level quantization, or both, on a second bandwidth part.

15. The apparatus of claim 7, wherein the instructions are further executable by the one or more processors, individually or collectively, to cause the apparatus to:
receive control signaling indicating that the UE is to utilize the slot level quantization on a first bandwidth part and the slot level quantization or the symbol level quantization on a second bandwidth part.

16. The apparatus of claim 7, wherein the instructions to identify that the UE is to utilize the slot level quantization are executable by the one or more processors, individually or collectively, to cause the apparatus to:
receive control signaling that is radio resource control signaling, downlink control information, a medium access control (MAC) control element, or any combination thereof, indicating that the UE is to utilize the slot level quantization.

17. The apparatus of claim 7, wherein the instructions are further executable by the one or more processors, individually or collectively, to cause the apparatus to:
receive control signaling indicating that the UE is to utilize the symbol level quantization;
receive a third transmission on the first channel; and
communicate, responsive to receiving the third transmission, a fourth transmission via the second channel at a second quantized starting time determined in accordance with the symbol level quantization.

18. The apparatus of claim 7, wherein the instructions are further executable by the one or more processors, individually or collectively, to cause the apparatus to:
receive control signaling indicating that the UE is to apply the symbol level quantization on a first carrier and the slot level quantization on a second carrier that differs from the first carrier, wherein the first carrier is a scheduling carrier for the second carrier.

19. The apparatus of claim 7, wherein the instructions are further executable by the one or more processors, individually or collectively, to cause the apparatus to:
receive control signaling indicating that the UE is to apply the symbol level quantization on a first carrier having a first subcarrier spacing and the slot level quantization on a second carrier having a second subcarrier spacing that is higher than the first subcarrier spacing.

20. The apparatus of claim 7, wherein the instructions are further executable by the one or more processors, individually or collectively, to cause the apparatus to:
receive control signaling that is radio resource control signaling, downlink control information, a medium access control (MAC) control element, or any combination thereof, indicating which of the slot level quantization or the symbol level quantization the UE is to utilize.

21. An apparatus for wireless communications by a base station, comprising:
one or more processors,
memory in communication with the one or more processors, and
instructions stored in the memory and executable by the one or more processors, individually or collectively, to cause the apparatus to:
receive a report indicating a capability of a UE to support symbol level quantization, slot level quantization, or both;
determine that the UE is to utilize the slot level quantization;
transmit control signaling indicating that the UE is to utilize the slot level quantization in which:
a symbol level offset is converted to a number of slots based on a ceiling function, and
a slot level offset is applied relative to an ending symbol period of a first transmission based at least in part on the number of slots to identify a quantized start timing for a second transmission;
transmit the first transmission via a first channel; and
communicate, responsive to transmission of the first transmission, the second transmission via a second channel at the quantized start timing determined in accordance with the slot level quantization.

22. An apparatus for wireless communications by a user equipment (UE), comprising:
one or more processors,
memory in communication with the one or more processors, and
instructions stored in the memory and executable by the one or more processors, individually or collectively, to cause the apparatus to:
transmit a report indicating a capability of the UE to support symbol level quantization, slot level quantization, or both;
receive control signaling indicating that the UE is to utilize the slot level quantization in which:
a symbol level offset is applied for determining a non-quantized start timing within a first slot for a second transmission relative to an ending symbol period of a first transmission, and
the non-quantized start timing is quantized to a boundary of a next slot after the first slot to identify a quantized start timing for the second transmission;
receive the first transmission via a first channel; and
communicate, responsive to reception of the first transmission, the second transmission via a second channel at the quantized start timing determined in accordance with the slot level quantization.

23. The apparatus of claim 22, wherein the instructions are further executable by the one or more processors, individually or collectively, to cause the apparatus to:
receive a grant allocating a resource of the first channel for the first transmission, wherein the second transmission is a feedback message for the first transmission that is communicated via the second channel at the quantized start timing determined in accordance with the slot level quantization.

24. The apparatus of claim 22, wherein the instructions to receive the first transmission are executable by the one or more processors, individually or collectively, to cause the apparatus to:
receive the first transmission that is a grant allocating a resource of the second channel for the second transmission.

25. The apparatus of claim 22, wherein the instructions to identify that the UE is to utilize the slot level quantization are executable by the one or more processors, individually or collectively, to cause the apparatus to:
identify that the UE is to utilize the slot level quantization based at least in part on a determination that control signaling indicating which of the symbol level quantization or the slot level quantization to use has not been received in response to transmission of the report.

26. The apparatus of claim 22, wherein the instructions to transmit the report are executable by the one or more processors, individually or collectively, to cause the apparatus to:
transmit the report providing a first capability indication of the UE to support the symbol level quantization, the slot level quantization, or both, for a first bandwidth part.

27. The apparatus of claim 26, wherein the instructions to transmit the report are executable by the one or more processors, individually or collectively, to cause the apparatus to:
transmit the report providing a second capability indication of the UE to support the symbol level quantization, the slot level quantization, or both, for a second bandwidth part that is different than the first bandwidth part.

28. The apparatus of claim 22, wherein the instructions to transmit the report are executable by the one or more processors, individually or collectively, to cause the apparatus to:
transmit the report providing a capability indication of the UE to support the symbol level quantization, the slot level quantization, or both, for each bandwidth part of a plurality of bandwidth parts.

29. The apparatus of claim 22, wherein the instructions to transmit the report are executable by the one or more processors, individually or collectively, to cause the apparatus to:
transmit the report providing a first capability indication of the UE to support the slot level quantization, the symbol level quantization, or both, on a first bandwidth part and a second capability indication of the UE to support the symbol level quantization, the slot level quantization, or both, on a second bandwidth part.

30. The apparatus of claim 22, wherein the instructions are further executable by the one or more processors, individually or collectively, to cause the apparatus to:
receive control signaling indicating that the UE is to utilize the slot level quantization on a first bandwidth part and the slot level quantization or the symbol level quantization on a second bandwidth part.

31. The apparatus of claim 22, wherein the instructions to identify that the UE is to utilize the slot level quantization are executable by the one or more processors, individually or collectively, to cause the apparatus to:
receive control signaling that is radio resource control signaling, downlink control information, a medium access control (MAC) control element, or any combination thereof, indicating that the UE is to utilize the slot level quantization.

32. The apparatus of claim 22, wherein the instructions are further executable by the one or more processors, individually or collectively, to cause the apparatus to:
receive control signaling indicating that the UE is to utilize the symbol level quantization;
receive a third transmission on the first channel; and
communicate, responsive to receiving the third transmission, a fourth transmission via the second channel at a second quantized starting time determined in accordance with the symbol level quantization.

33. The apparatus of claim 22, wherein the instructions are further executable by the one or more processors, individually or collectively, to cause the apparatus to:
receive control signaling indicating that the UE is to apply the symbol level quantization on a first carrier and the slot level quantization on a second carrier that differs from the first carrier, wherein the first carrier is a scheduling carrier for the second carrier.

34. The apparatus of claim 22, wherein the instructions are further executable by the one or more processors, individually or collectively, to cause the apparatus to:
receive control signaling indicating that the UE is to apply the symbol level quantization on a first carrier having a first subcarrier spacing and the slot level quantization on a second carrier having a second subcarrier spacing that is higher than the first subcarrier spacing.

35. The apparatus of claim 22, wherein the instructions are further executable by the one or more processors, individually or collectively, to cause the apparatus to:
receive control signaling that is radio resource control signaling, downlink control information, a medium access control (MAC) control element, or any combination thereof, indicating which of the slot level quantization or the symbol level quantization the UE is to utilize.

* * * * *